United States Patent
Tsai et al.

(10) Patent No.: US 11,483,844 B1
(45) Date of Patent: *Oct. 25, 2022

(54) MULTI-MODE DYNAMIC FREQUENCY SELECTION SYSTEM

(71) Applicant: Amazon Technologies, Inc., Seattle, WA (US)

(72) Inventors: Kun Ting Tsai, Fremont, CA (US); Kiran Kumar Edara, Cupertino, CA (US); Sarang Wagholikar, Sunnyvale, CA (US); Omar Fawazhashim Zakaria, Santa Clara, CA (US); Ashish Kumar Shukla, Milpitas, CA (US); Cheol Su Kim, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/949,901

(22) Filed: Nov. 19, 2020

Related U.S. Application Data

(63) Continuation of application No. 16/250,315, filed on Jan. 17, 2019, now Pat. No. 10,880,903.

(51) Int. Cl.
| | |
|---|---|
| *H04W 88/08* | (2009.01) |
| *H04B 7/0404* | (2017.01) |
| *H04W 84/18* | (2009.01) |
| *H04W 72/08* | (2009.01) |
| *H04L 67/10* | (2022.01) |
| *H04L 41/12* | (2022.01) |
| *H04L 5/00* | (2006.01) |

(52) U.S. Cl.
CPC ......... *H04W 72/085* (2013.01); *H04L 5/0062* (2013.01); *H04L 41/12* (2013.01); *H04L 67/10* (2013.01); *H04B 7/0404* (2013.01); *H04W 84/18* (2013.01); *H04W 88/08* (2013.01)

(58) Field of Classification Search
CPC ....... H01Q 3/46; H01Q 21/065; H04W 52/52; H04W 24/02; H04W 16/10; H04W 72/02; H04W 72/0453; H04W 8/00; H04W 28/20; H04W 88/08; H04W 16/14
See application file for complete search history.

(56) References Cited

U.S. PATENT DOCUMENTS

| | | | |
|---|---|---|---|
| 10,523,247 B2* | 12/2019 | Gopalakrishnan ... | H01Q 21/205 |
| 2013/0155949 A1* | 6/2013 | Pochop, Jr. ............ | H01Q 21/28 |
| | | | 370/328 |
| 2020/0091607 A1* | 3/2020 | Black ..................... | H01Q 11/02 |

* cited by examiner

*Primary Examiner* — Iqbal Zaidi
(74) *Attorney, Agent, or Firm* — Lowenstein Sandler LLP

(57) ABSTRACT

A wireless mesh network includes a first wireless access point (WAP) device designated as a primary device, where the first WAP device provides network connectivity to a plurality of client devices over a first dynamic frequency selection (DFS) channel. A second WAP device is designated as a secondary device to the first WAP device on the first DFS channel. In response to detection of a radar event by the first WAP device: the first WAP device transitions to being the secondary device on the first DFS channel; the second WAP device transitions to being the primary device on the first DFS channel; and the second WAP device performs a channel availability check (CAC) on a second DFS channel and communicates availability of the second DFS channel to the first WAP device.

20 Claims, 18 Drawing Sheets

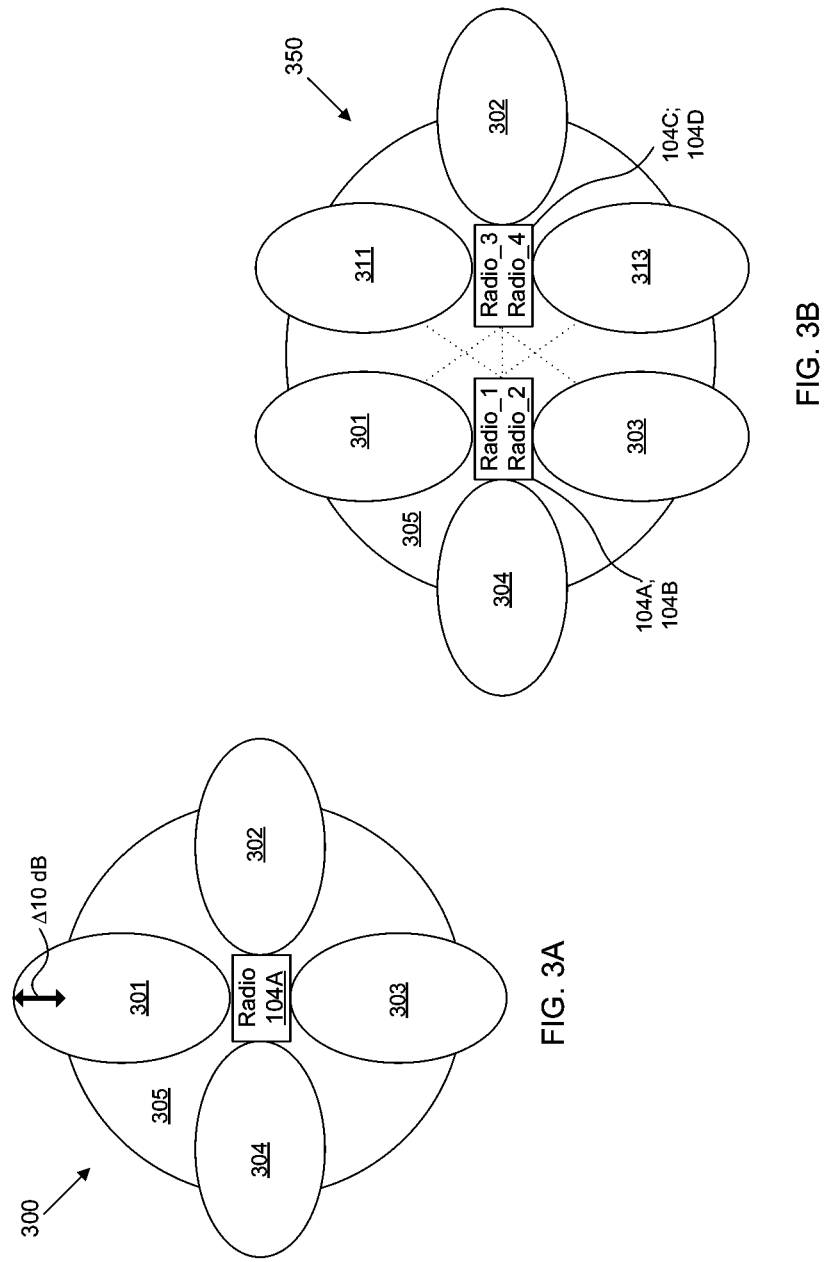

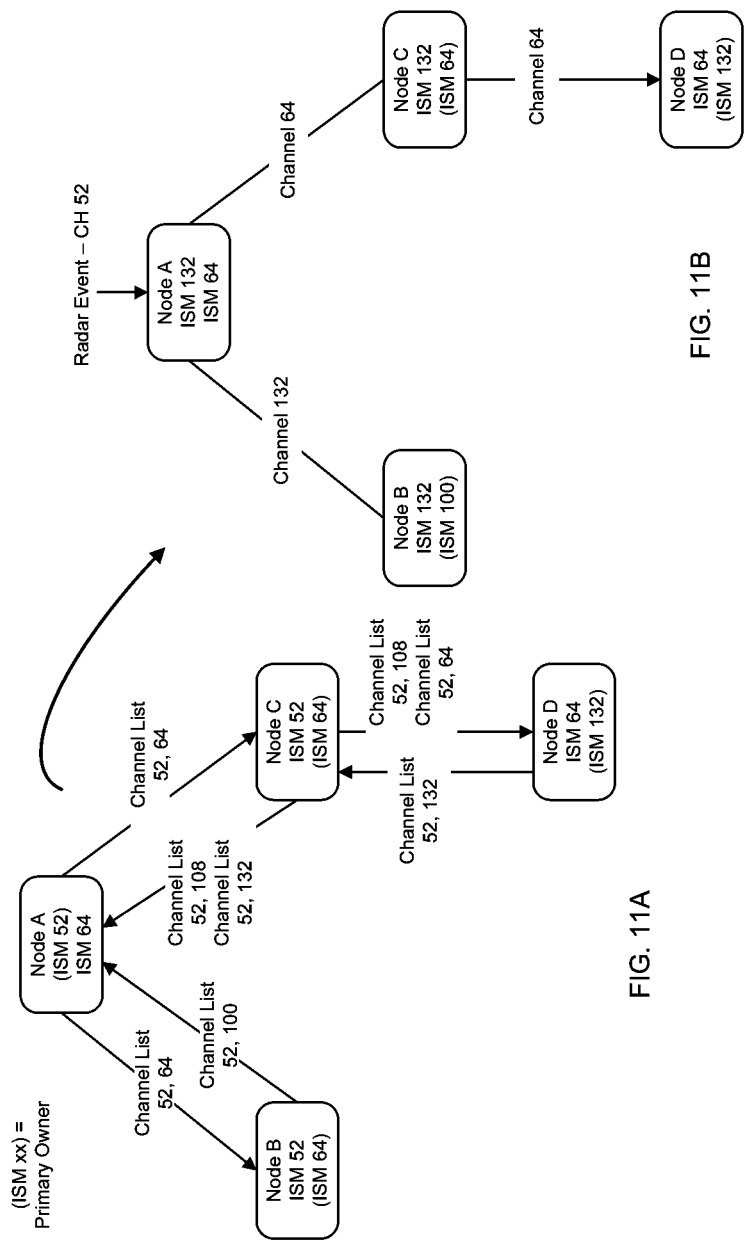

MULTI-MODE DYNAMIC FREQUENCY SELECTION SYSTEM

RELATED APPLICATIONS

This application is a continuation of U.S. application Ser. No. 16/250,315, filed Jan. 17, 2019, the entirety of which is incorporated herein by this reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, at least some of these electronic devices are to include dynamic frequency selection (DFS) capability in order to detect radar interference and move off a channel if radar is detected.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3A is a wireless signal diagram illustrating radiation patterns associated with a single-radio antenna matrix according to an embodiment.

FIG. 3B is a wireless signal diagram illustrating radiation patterns associated with a multiple-radio antenna matrix according to an embodiment.

FIGS. 11A and 11B are a network diagram of multiple WAP devices (nodes) within the WMN that illustrates switching to a next channel in response to a radar event and when more than one of the WAP devices is a primary owner according to an embodiment.

DETAILED DESCRIPTION

Figure 1A:
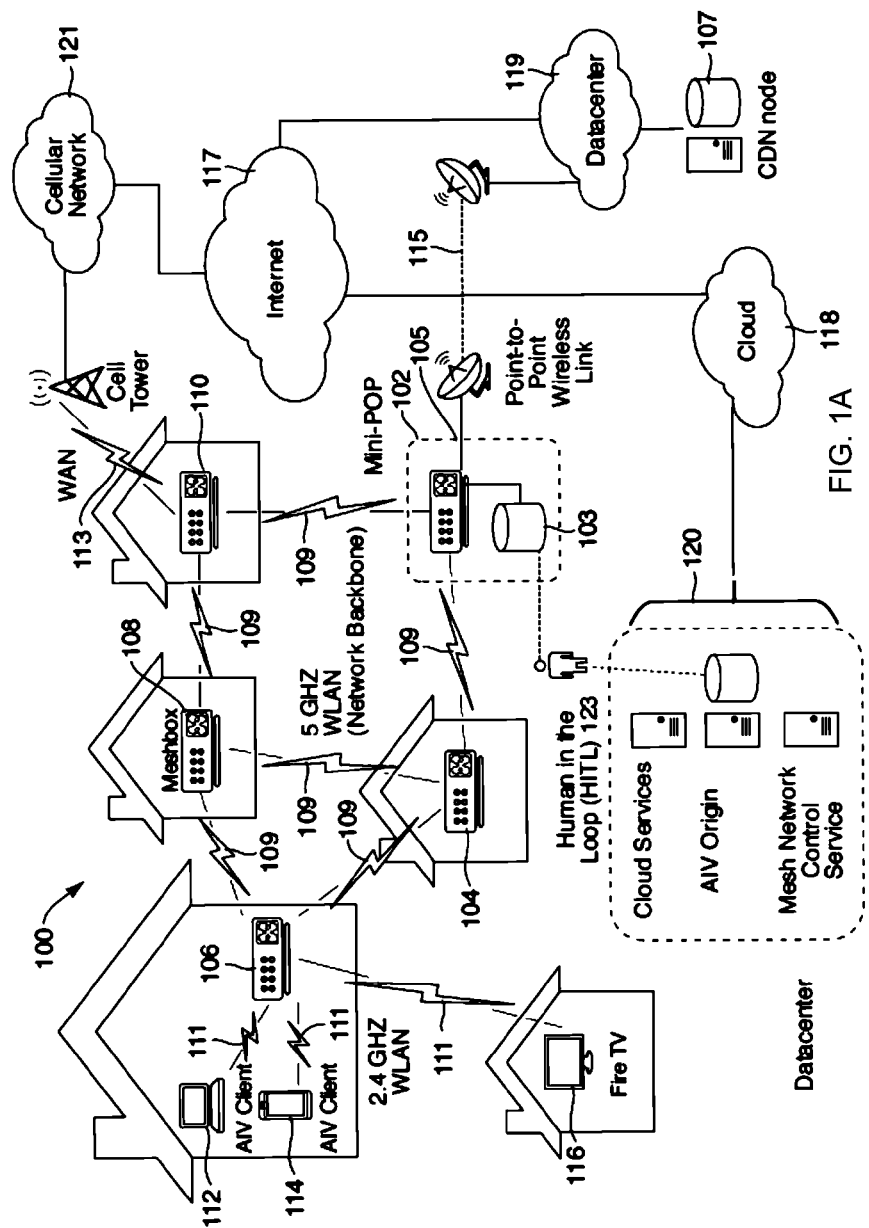
FIG. 1A is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The disclosed embodiments may further be applied to mesh networks deployed in other parts of the world, including a variety of mesh networks made up of multiple wireless access point (WAP) devices.

In many countries, regulatory requirements may limit the available number of 5 GHz channels or place additional restrictions on their use because the spectrum is shared with other technologies and services. For instance, in the United States and other countries, some of the Unlicensed National Information Infrastructure (U-NII) bands are used by radar systems, e.g., 5.25 GHz to 5.35 Hz and 5.47 GHz to 5.725 GHz. Radar systems are deployed by, for example, federal civilian organizations, specific civilian industrial industries (such as weather, medical), and military organizations. Networks operating using the Wi-Fi® network technology in those bands are required to employ a radar detection and avoidance capability. The IEEE 802.11h standard addresses this requirement by adding support for dynamic frequency selection (DFS) and transmit power control (TPC) on DFS channels. Such capability is not required on non-DFS channels.

Furthermore, U-NII devices (such as the WAP devices discussed herein) are to employ a DFS radar detection mechanism to detect the presence of radar system and to avoid co-channel operation with those radar systems. The minimum DFS detection threshold for devices with a maximum equivalent isotropically radiated power (ERIP) of 200 milliwatt (mW) to 1 W is −64 decibel-milliwatts (dBm). For devices that operate with less than 200 mW ERIP, the minimum detection threshold is −62 dBm. This interference detection threshold is the received power averaged over one microsecond referenced to a 0 dBi antenna. The DFS process is to further provide a uniform spreading of the loading over all available channels.

Herein, when a WAP device detects a radar event, the radar signals that are detected meet the interference detection threshold. Radar systems generate radar signals that are either continuous or pulsed. With the advancement in radar technology, pulsed radar is more common, which usually are detectable as having a particular pulse pattern. In one embodiment, the pulses of the pulse pattern of a radar event are about one microsecond long and are spaced by 100 microsecond delays, although other types and durations of pulse patterns are envisioned. The WAP devices discussed herein may be capable of detecting different types of radar as a radar event, and may further take steps to avoid a false detection of radar as will be discussed.

In various embodiments, DFS functionality is further integrated within at least some of the WAP devices of the WMN. If a WAP device is designated as a primary device (also referred to herein as a primary owner), the WAP device is to lose its operating channel upon detecting a radar event. This primary WAP device may employ a radar interference detection function to detect the radar event, where the detection function is governed by the interference detection threshold and other pulse pattern detection capability. The primary WAP device may initiate an unlicensed U-NII network by transmitting control signals that will enable other unlicensed U-NII devices to associate (participate in a wireless network) with the primary WAP device. Further, a second WAP device may be designated as a secondary device when the second WAP device joins in and participates in the wireless network initiated by primary WAP device.

Before initiating a network on a channel, the primary owner/WAP device is to perform a channel availability check (CAC) for a certain duration (such as for a minute) to ensure that there is no radar operating on the channel. During normal operation, the primary WAP device is to monitor the operation channel to ensure that there are no radar signals operating on the channel, which is referred to as in-service monitoring (ISM). If the primary WAP device detects a radar signal during ISM, the operating channel of the unlicensed U-NII network is made unavailable. In response, the primary WAP device stops transmitting on the radio associated with the channel and instructs (e.g., signals) associated client wireless devices to also stop transmitting on the channel. The primary WAP device and associated client wireless devices are to vacate the channel within a channel move time, e.g., 10 seconds in one embodiment, although other move times are envisioned. The aggregate transmission during the channel move time is to be limited to a channel closing transmission time, e.g., 260 ms in one embodiment.

In various embodiments, the disclosed WAP devices each may include a number of radios and a number of directional antennas that are selectively coupled to the radios via a switch matrix, e.g., one or more cascaded switches. This hardware in a WAP device may enable the operation of different channels that are wirelessly directed in particular directions. Some of these channels may be DFS channels and some of these channels may be non-DFS channels. Each WAP device may transmit information associated with these channels, e.g., their associated radios and directional antennas may be communicated to a cloud server (or other such computing device) of the WMN. The cloud server may further store network topology information about the multiple WAP devices of the WMN for geographic associations of respective WAP devices.

In some situations, due to channel crowding on the inside of a building that houses a number of WAP devices and associated client wireless devices, one or more WAP devices may falsely detect a radar event, referred to herein as false radar detection. Accordingly, the WAP devices located outside of the building may more accurately detect the radar event, which comes from outside of the building from a radar source. To improve accuracy and prevent the disruption that comes from having to move to a new channel in response to false radar detection, the cloud server may assign a first WAP device that is outside the building as a primary owner and a second WAP device that is inside of the building as a secondary device within the WMN. A primary owner may, as a default, be a primary device of one or more DFS channels. A secondary device may, as a default, not be a primary device on a DFS channel, but may be specifically assigned to be a primary device on at least one channel in some circumstances.

Further, the cloud server may assign a radio of either of the first or second WAP devices as a primary device on a DFS channel. The server may determine that the radio may be coupled to a directional antenna that is directed to the outside of the building, e.g., away from an outer wall of the building if the WAP device is outside or towards the outer wall if the WAP device is inside the building. The cloud server may assign coupling of a directional antenna to a particular radio on an identified WAP device to direct operation on the DFS channel towards expected sources of radar transmission. In this way, the cloud server may customize the direction of operation of a DFS channel owned by the identified WAP device for purposes of performing DFS functionality. Similar customization (e.g., via designation as a secondary device) may be performed on channels directed away from expected sources of radar as will be explained.

In one embodiment, a computing device (e.g., cloud server) is communicatively coupled to multiple WAP devices within the WMN. The computing device may include one or more memory devices to store network topology information of the wireless mesh network, a communication interface to communicate with the other WAP devices, and a processing device. In one embodiment, the processing device determines, based on the network topology information, a first WAP device is located outside of a building, where at least one other WAP device is located inside of the building. For example, the network topology information may include information typical of a topological map combined with known positions of WAP devices. The network topology information may be augmented using returned signal strength information (RSSI) data gathered by the WAP devices, which informs the cloud server of additional details related to structures such as the building, as well as other obstacles in the environment of the WAP devices. The processing device may assign the first WAP device as a primary owner with DFS capability.

In the present embodiment, the processing device may further determine that the first directional antenna is directed away from an outer wall of the building using the network topology information. The processing device may assign a first radio, of the first WAP device, as a primary device on a first DFS channel and assign the first directional antenna, of the first WAP device, to be coupled to the first radio. The processing device may further transmit, to the first WAP device, a first message with first assignment information regarding the first WAP device being assigned as the primary owner, the first radio being assigned as a primary device on the first DFS channel, and the first directional antenna being coupled to the first radio.

In another, related embodiment, the processing device determines, using the network topology information, a second WAP device of the multiple WAP devices is located inside of the building. The second WAP device may include a second radio and a second directional antenna. The processing device may determine that a radiation pattern of the second directional antenna is directed towards the outer wall of the building using the network topology information. The processing device may further assign the second WAP device as a secondary device. The processing device may assign the second radio as a primary device on a second DFS channel and assign the second directional antenna to be coupled to the second radio. The processing device may then transmit, to the second WAP device, a second message with second assignment information regarding the second WAP device being assigned as the secondary device, the second radio being assigned as a primary device on the second DFS channel, and the second directional antenna being coupled to the second radio.

As will be discussed in more detail, the cloud server may also monitor DFS channels on the WAP devices throughout the WMN for certain channel usage metrics, such as number of radar events detected, application data bandwidth usage (or data transfer rate (DTR)), and number of latency-sensitive applications being served, among others. These metrics may be employed to not only decide on designations of other WAP devices as primary owner or secondary device, but also for the cloud server to make further assignments of radios as primary/secondary on particular channels in view of which directional antenna to couple to which radio in different contexts, which will be explained.

FIG. 1A is a network diagram of network hardware devices 102-110, organized in a wireless mesh network (WMN) 100, for content distribution to client devices, including client wireless devices, in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100, to include client wireless devices. At least some of the multiple network hardware devices 102-110 include the WAP devices discussed herein.

In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and WAP devices). The mesh nodes 104-110 may establish multiple peer-to-peer (P2P) wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. A content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Although various embodiments herein are directed to content delivery, such as for the Amazon Instant Video (AIV) service or for an Echo® application, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

At least some of the client consumption devices are client wireless devices according to various embodiments. In particular, the second mesh node 106 is wirelessly coupled to a first client consumption device 112 (Echo® device) via a first N2C wireless connection 111, a second client consumption device 114 (AIV client) via a second N2C wireless connection 111, and a third client consumption device 116 (e.g., a Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g., email, shopping on Amazon.com, or the like).

Figure 1B:
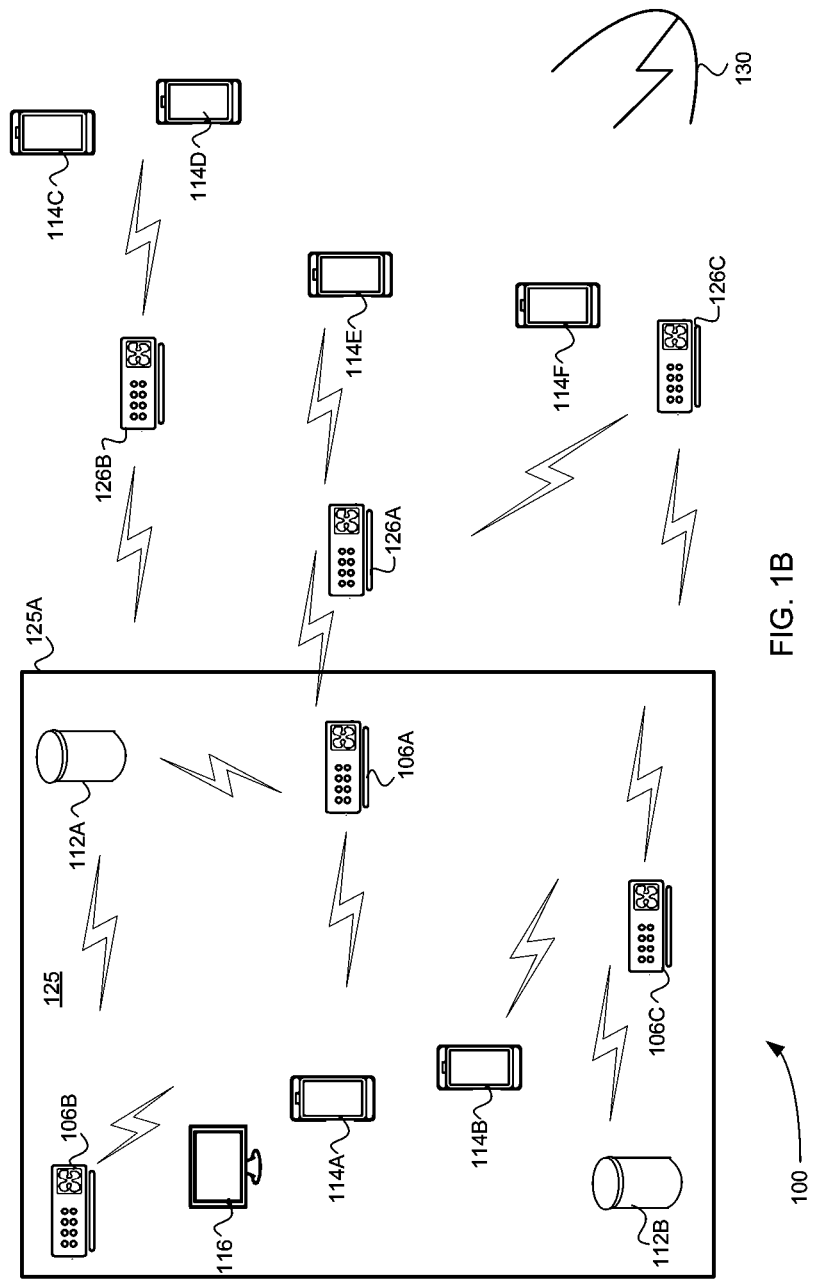
FIG. 1B is a network diagram of wireless access point (WAP) devices of the WMN distributed with reference to a building for content distribution to client wireless devices according to one embodiment.

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house or building, as illustrated in FIG. 1. As illustrated, the second mesh node 106 services a first client consumption device 112 (e.g., Echo® device or AIV client) and a second client consumption device 114 (e.g., AIV client) located in a first house, as well as a third client consumption device 116 (e.g., the Fire TV client) located in a second house. The Meshbox nodes can be located in various structures and there can be multiple Meshbox nodes in a single structure as well as multiple Meshbox nodes outside of the structure (FIG. 1B).

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires a priori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes (e.g., WAP devices) that become unavailable, adding, removing, or modifying existing mesh nodes in the WMN 100. The cloud services 120 may further generate a channel preference list, which is useable by the WAP devices to determine, based on dynamic frequency selection (DFS) requirements, a next channel to which to move in response detection of a radar event on a current channel. The cloud services 120 may also include mechanisms for analyzing DFS-related data (e.g., network topology information, radar event detection history, per-device radar event probability) for the WAP devices of the WMN 100, and assigning particular WAP devices to be either a primary device or a secondary device. These assignments may extend to ownership of particular channels by the particular WAP devices. Further, the cloud services 120 may analyze level of channel usage (e.g., amount of historical application bandwidth served (or DTF), number of frequency-sensitive applications historically served, and the like) for identified channels, and make further assignments of channel ownership to the particular WAP devices based on these (and other such) metrics associated with level of channel usage. Further capabilities of the cloud services 120 will be discussed in more detail with reference to FIG. 1B through FIG. 6.

FIG. 1B is a network diagram of WAP devices of the WMN 100 distributed with reference to a building 125 for content distribution to client wireless devices according to one embodiment. The building 125 may include an outer wall 125A and have multiple of the client wireless devices inside of the building. The client wireless devices may include, for example, first wireless client devices 112A, 112B (e.g., Echo® device or AIV client), second wireless client devices 114A, 114B (e.g., AIV client), and a third client wireless device 116 (e.g., a Fire TV device). The building 125 may further include multiple WAP devices including a secondary WAP device 106B, a fourth WAP device 106B, and a sixth WAP device 106C. Each of the client wireless devices may generally wireless connect to the closest WAP device of the multiple WAP devices, and the WAP devices may wirelessly connect to each other or to a portion of the network background discussed and illustrated with reference to FIG. 1A.

The WMN 100 may further include multiple client wireless devices 114C, 114D, 114E, 114F outside of the building, which may be AIV clients or a mix of different types of wireless client devices. The WMN 100 may further include multiple WAP devices located outside of the building, e.g., a first WAP device 126A, a third WAP device 126B, and a fifth WAP device 126C. The multiple client wireless devices 114C, 114D, 114E, 114F may wirelessly connect to the closest of the multiple WAP devices 126A, 126B, and 126C located outside of the building, and the WAP devices 126A, 126B, and 126C may wirelessly connect to each other or to a portion of the network backbone discussed and illustrated with reference to FIG. 1A. In one embodiment, the first WAP device 126A may wirelessly connect to the second WAP device 106A and/or the second WAP device 106A may wireless connect to the first WAP device 126A depending on channel configuration and the like. In this way, the connectivity of the WMN 100 may be linked between the inside of the building across the outer wall 125A to the outside of the building 125.

The WMN 100 may further be exposed to radar events from a radar source 130 such as from an airport, a weather station, a medical facility, or a military base, for example. In response to detection of a radar event, any of the multiple WAP devices that are designated as a primary owner may terminate transmissions on their radio on the current DFS channel that it owns, and direct (or cause) the connected client wireless devices to move to another DFS channel. This change to another DFS channel is required whether or not the radar event is false radar detection.

When a WAP device loses its operating channel, the WAP device either moves to a non-DFS channel or another DFS channel. In the event that the WAP device moves to a DFS channel, the WAP device terminates transmission to perform CAC (e.g., for 60 seconds) before the WAP device can service clients again. Due to the high occurrence of false radar detections, the requirement to terminate transmission for 60 seconds before servicing clients, and the lack of channel selection consensus among WAP devices, DFS channels are traditionally not feasible for wireless backhauls in a wireless network system such as the WMN 100. Furthermore, if a primary WAP device switches its operating channel to another channel without informing other neighbor WAP devices (e.g., associated WAP devices), this creates large latencies in the WMN 100 that may cause the WMN 100 to hang up or stall. The large latencies may be due to each secondary WAP device determining to which primary WAP device to connect and on which new operating channel. The false detections also increase in frequency within the inside of the building 125 due to the noisy electromagnetic environment that causes adjacent channel interference and hidden node interference. Hidden node interference may be generated by virtue of other WAP devices in the vicinity operating on a different channel, for example.

Figure 2A:
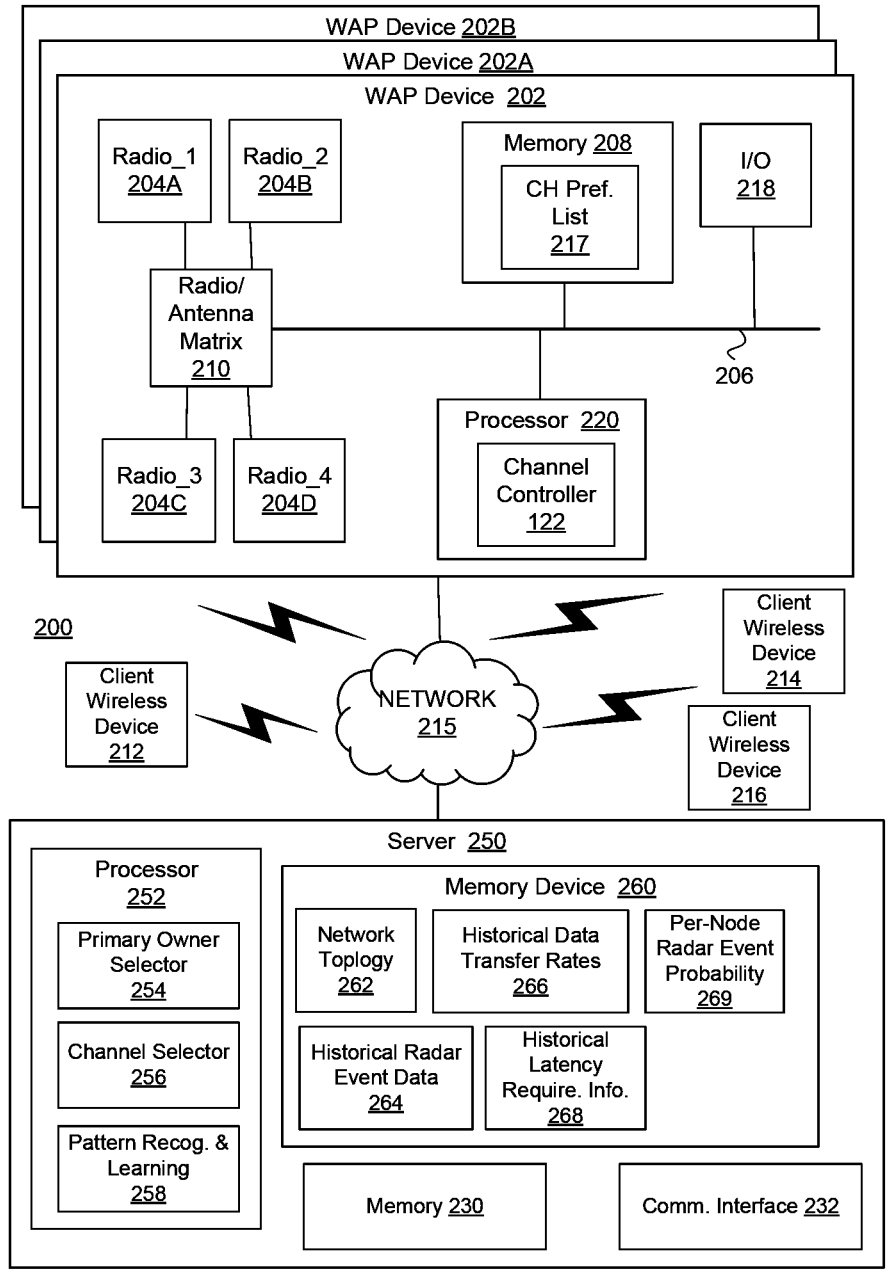
FIGS. 2A, 2B, and 2C are block diagrams of a multi-mode frequency selection system associated with dynamic frequency selection (DFS) capability across WAP devices and channels of the WMN according to various embodiments.
Figure 2B:
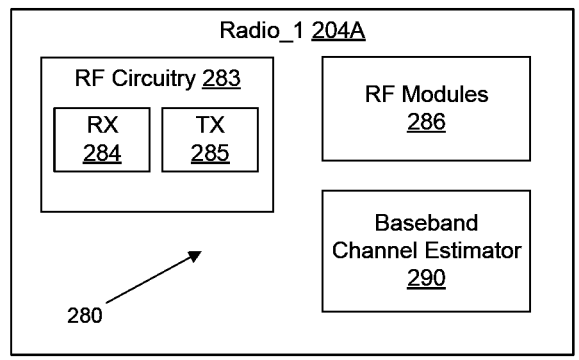
Figure 2C:
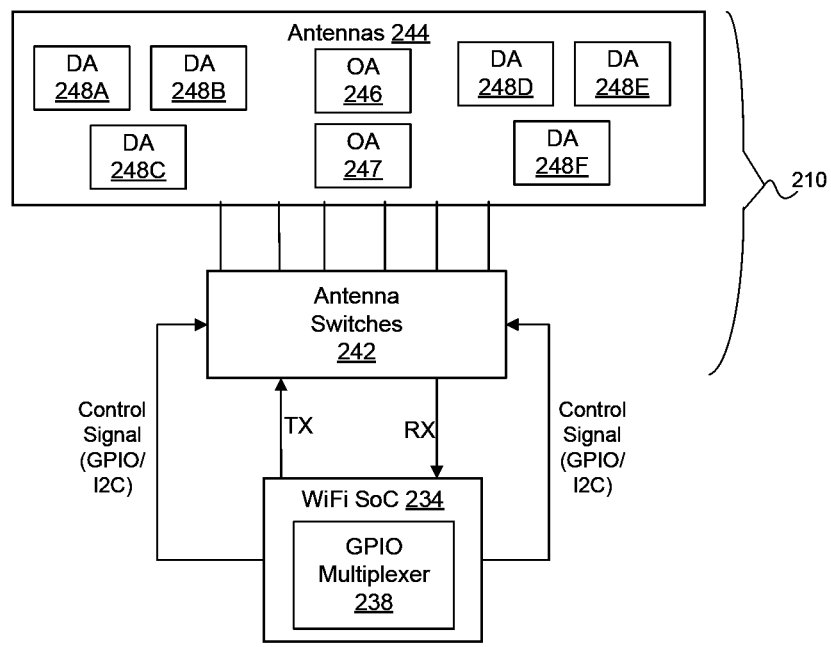

FIGS. 2A, 2B, and 2C are block diagrams of a multi-mode frequency selection system 200 that facilitates multi-mode dynamic frequency selection (DFS) by multiple WAP devices associated with multiple client wireless devices according to various embodiments. The multi-mode frequency selection system 200 may include a first WAP device 202, a second WAP device 202A, and a third WAP device 202B, to be representative of the multiple WAP devices illustrated in FIGS. 1A-1B. While the first WAP device 202 will be discussed in more detail, the first WAP device 202 is also representative of others of the multiple WAP devices discussed herein throughout the various Figures. The term "multi-mode" DFS makes reference to the ability that each of the multiple WAP devices has to function as either a primary owner (and thus to provide DFS capability) or as a secondary device, and thus to connect to the WNM 100 via a primary WAP device. Further, these designations are on a per-channel basis, and thus, although a primary WAP device may own a first DFS channel, another WAP device may own a second DFS channel for which the primary WAP device is designated as a secondary device on the second DFS channel. The fluidity of making such device assignments (as primary device or secondary device) and channel ownership assignments improves the ability of the multiple WAP devices to, as a group of nodes, detect and avoid radar signals on one or more channels as will be discussed in detail.

The multi-mode frequency selection system 200 may further include a first client wireless device 212, a second client wireless device 214, and a third client wireless device 216 that are representative of the client consumption devices of FIG. 1A and of the client wireless devices of FIG. 1B. These client wireless devices 212, 214, and 216 increasingly fill up homes and buildings sometimes move throughout the day or night. In various embodiments, the first WAP device 202 is a WAP device that connects directly to a wired local area network (LAN) and provides wireless connections using wireless LAN technology, such as the Wi-Fi® technology, for other devices to use that wired connection. The first WAP device 202 may be an electronic device that implements the 2.4 GHz access point (AP) and a 5 GHz access point (AP) integrated in the same device. Furthermore, one or more wireless APs of the first WAP device 202 may be implemented by processing logic including hardware, software, firmware, or any combination thereof. It should also be noted that the electronic device may also include additional radios to one or more WLAN radios used to implement the one or more APs, such as wireless personal area network (WPAN) radios, wireless wide area network (WAN) radios, a global position system (GPS) device, and the like.

In various embodiments, the first WAP device 202 is representative of the multiple WAP devices referenced in FIGS. 1A-1B. In the embodiments, the first WAP device 202 includes multiple radios, e.g., a first radio 204A, a second radio 204B, a third radio 204C, and a fourth radio 204D, although more or fewer radios are envisioned in other embodiments coupled to a radio/antenna matrix 210. As will be discussed in more detail with reference to FIGS. 2C, 3A, and 3B, the radio/antenna matrix 210 may include at least one omnidirectional antenna, multiple directional antennas, and antenna switches. The first WAP device 202 may further include memory 208 to store a channel preference list 217 among other data, one or more input/output devices 218, and a processor 220 (or other processing device).

The channel preference list 217 may be representative of any data structure capable of storing a list of channels that are ordered according to a priority of a next channel to which to jump in response to a radar event. As per Table 1, the channel preference list 217 indexes, against the list of channels, which WAP device is the primary device of the channel and a radio to operate on that channel. The channel preference list 217 may optionally further identify an antenna to be coupled to the radio. For example, the antenna may be a particular directional antenna (DA) or an omnidirectional antenna (OA), as will be discussed in more detail. The channel preference list 217 may be received, by respective WAP devices, from a server 250, e.g., a cloud computing device such as a cloud server. The WAP devices may further transmit the channel preference list 217 to the client wireless devices 212, 214, 216 to be stored at the client wireless devices. In this way, the client wireless devices 212, 214, 216 may quickly transition to the next channel in the ordered list of channels of the channel preference list in response to a radar detection signal from the first WAP device 202, e.g., an originator node.

TABLE 1

| Channel No. | Primary Owner | Radio | Antenna |
|---|---|---|---|
| 1 | WAP device 1 | A | DA_1 |
| 2 | WAP device 2 | B | DA_2 |
| 3 | WAP device 1 | D | OA_5 |

According to one embodiment, the first WAP device 202 is wirelessly coupled to the second WAP device 202B and a third WAP device 202C of the multiple WAP devices, e.g., on a first DFS channel (e.g., channel one). Each of the second and third WAP devices is to store the channel preference list 217 in which a second channel (e.g., channel two) is listed sequentially as a next channel. This second channel may or may not be a DFS channel, and if a non-DFS channel, need not perform CAC in response to the a radar event. Each of the second and third WAP devices may then, in response to the radar event, receive, from the first WAP device, a notice indicative of the radar event and, in response to the notice, move to the second channel over which to communicate with the first WAP device. In the alternative, if the second and third WAP devices also detect the radar event on the first DFS channel, they may automatically move to the next channel in the channel preference list 217. In this way, the second and third WAP devices may converge on the next channel (e.g., the second channel) much quicker than having to confirm the next channel within a radar event packet (REP) or the like received from the first WAP device.

The processor 220 may also use the data structure to configure and re-configure the radio/antenna matrix 210 to define a particular path to a particular antenna. As described herein, the radio/antenna matrix 210 can be re-configured for transmission and reception of data on a per-frame basis or at least on a per-channel basis. These components may all be coupled to a communications bus 206. The processor 220 may further include a channel controller 222 to read the channels of the channel preference list 217 and to correctly control the radio/antenna matrix to selectively couple the correct antenna to the correct radio on which will operate a current channel, e.g., the operating channel, according to the channel preference list. The channel controller 222 may include processing logic that may comprise hardware (e.g., circuitry, dedicated logic, programmable logic, microcode, etc.), software (such as instructions running on the processor), firmware or a combination thereof. In some embodiments, one or more of the client wireless devices 212, 214, 216 may be built with the same or similar components as the first WAP device 202.

The first WAP device 202 may connect to a network 215 and communicate with a server 250, such as a cloud server or other computing device, accessible over the network 215. In various embodiments, the server 250 may include memory 230, a communication interface 232, a processor 252, and a memory device 260. The communication interface 232, which may include one or more network devices for connecting to the Internet, may be adapted to also wirelessly couple the server 250 to the multiple WAP devices 202, 202A, 202B, and to receive data from the multiple WAP devices. The data received from the multiple WAP devices 202, 202A, and 202B may include, for example, network topology information, such as node location and building structure layouts, historical radar event data (e.g., which WAP devices detected radar events on which channels), historical data transfer rate requirements (e.g., from applications on the client wireless devices), historical application latency requirements (e.g., by content streaming applications of the client wireless devices), and per-node radar event probability (or information useable to determine a per-node radar event probability). The received data may further include information associated with, or useable to determine, pattern recognition and learning associated with radar event detection, data bandwidth requirements, and latency requirements, and the like.

In various embodiments, the processor 252 (e.g., processing device) includes a primary owner selector 254, a channel selector 256, and a pattern recognition and learning module 258. In embodiments, the memory device 260 includes data stored associated with network topology information 262 of the WMN 100, historical radar event data 264, historical data transfer rates (DTR) 266, historical latency requirements information 268, and per-node radar event probability 269, as these terms were discussed previously, and will be discussed in more detail. The network 215 may be representative of an Internet or WAN connection. Such an Internet or WAN connection may include additional links or trunks, whether wired or wireless, that may involve other types of wideband communication, including those based on cellular standard(s).

In some embodiments, the primary owner selector 254 is to analyze aspects of the data in the memory device 260 (listed above) and decide, based on those aspects, which WAP devices are to primary owners and which are to be secondary devices, as will be explained in detail. In additional or alternative embodiments, the channel selector 256 is to analyze the data stored in the memory device 260 specific to a particular WAP device, and decide whether a channel operating on the particular WAP device is to operate on a particular radio and a particular directional antenna that may be selectively coupled to that particular radio. In this way, the channel selector 256 is able to select a direction of radiation of a channel that operates on the WAP device. Considerations for which direction of operation of a channel may be chosen are discussed in more detail with reference to subsequent Figures.

In various embodiments, the pattern recognition and learning module 258 is to analyze the historical radar event data 264, and based on that analysis, recognize patterns of radar detection by particular WAP devices and optionally particular channels (e.g., radio and directional antenna paths) on the WAP devices. These radar detection patterns may be employed in generating the per-node radar event probability 269 and in selection of particular WAP devices to be primary owners of identified channels that are less likely to detect radar events during normal operation. The pattern recognition and learning module 258 may further analyze RF patterns in relation to particular radar detection events by the WAP devices for purposes determining false detection of radar signals. As will be explained in more detail, a WAP device operating as a primary device that begins to falsely detect a high number of radar events (e.g., above some false detection threshold), may be relegated to be a secondary device instead.

In one embodiment, the pattern recognition and learning module 258 is further to detect patterns of historical DTR 266, and based on that analysis, determine particular WAP devices (and optionally a channel on those particular WAP devices) that tend to support a comparably low DTR from the client wireless devices 212, 214,216. "Comparably low" may be below a threshold DTR demand for streaming data, for example. In some embodiments, the pattern recognition and learning module 258 determines those WAP devices that support the least DTR demand. The server 250 may select such WAP devices (and optionally a channel of least DTR demand) to be primary owners of the WAP device and/or a primary device of the channel.

The recognition and learning module 258 may further recognize similar patterns with relation to the historical latency requirements information 268 of applications (e.g., streaming media types of applications) of the client wireless devices. The server 250 may then assign usage of DFS channels, which have historically detected the fewest number of radar events, to support the greater number of latency-sensitive applications so as not to disrupt those channels that will be the most adversely impacted by latency by DFS functionality. Latency is the time between the occurrence of an event and its handling. For example, a media player that streams data is to react quickly to incoming media packets to transform the media packets to an audio output. Applications that are latency-sensitive have to react quickly to such incoming data, e.g., to prevent video being played out of synch with corresponding audio in the streaming data.

With additional reference to FIG. 2B, the first radio 204A, which is representative of each such radio of the first WAP device 202, may include RF front end circuitry 280 such as RF circuitry 283, e.g., a receiver (RX) 284 and a transmitter (TX) 285, a set of RF modules 286, and a baseband channel estimator 290. In one embodiment, one of the RF modules 286 may include a Wi-Fi® physical layer (PHY) at which the RF energy of received RF signals may be measured for purposes of received signal strength information (RSSI), e.g., from the client wireless devices 212, 214, 216, and PHY rate of data streaming. The baseband channel estimator 290, by virtue of being incorporated within the RF front end circuitry, may be coupled to the radio/antenna matrix 210, the RX 284, and to the TX 285, and be adapted to estimate the channel state information (CSI) or the RSSI for each channel. The CSI may include a detailed channel impulse response with both amplitude and phase information across all the Orthogonal Frequency Division Multiplexing (OFDM) subcarriers and be updated (at the maximum rate) every OFDM symbol. The CSI data may therefore be analyzed to passively determine signal strength from the client wireless device 212, 214, 216.

With additional reference to FIG. 2C, the radio/antenna matrix 210 includes multiple antennas 244 and antenna switches 242, according to various embodiments. The antennas 244 may include a first omnidirectional antenna 246, a second omnidirectional antenna 247 (and optionally additional omnidirectional antennas), a first directional antenna 248A, a second directional antenna 248B, a third directional antenna 248C, a fourth directional antenna 248D, a fifth directional antenna 248E, and a sixth directional antenna 248F, and optionally additional directional antennas. The antennas 244 can direct high gain signals to multiple client wireless devices to achieve high downlink throughput without sacrificing uplink signal reception. To do so, each of the antennas 244 may be selectively coupled, via the antenna switches 242, to a radio to either transmit or receive data, or to both transmit and receive data, during any given frame of multiple frames of streaming data. Each of the antenna switches 242 may be a single switch between a radio (e.g., one of the radios 204A, 204B, 204C, or 204D) and all of the antennas 244. As a number of the antennas 244 increases, some of the antenna switches 242 may need to be cascaded o selectively couple each of the radios to many antennas that are selectively coupled to a cascaded series of switches.

In one embodiment, the first WAP device 202 includes an integrated system-on-a-chip (e.g., a Wi-Fi® SoC) 234, which includes the radios 204A, 204B, 204C, and 204D, transmit (TX) and receive (RX) channels, and a general purpose input/output (GPIO) multiplexer 238. In one embodiment, at least some of the antenna switches 242 are also integrated within the Wi-Fi® SoC, and additional of the antenna switches 242 may be located off-chip of the Wi-Fi® SoC 234 to provide additional switching capability.

FIG. 3A is a wireless signal diagram illustrating radiation patterns associated with a single radio antenna matrix 300 according to an embodiment. The single radio may be the first radio 204A (or other radio like a first 5 GHz radio) for purposes of explanation where the single radio antenna matrix 300 may represent the radio/antenna matrix 210 (FIGS. 1A and 1C). The single radio antenna matrix 300 may include the first directional antenna 248A, the second directional antenna 248B, a third directional antenna 248C, a fourth directional antenna 248D, and a first omnidirectional antenna 246, which generate a first radiation pattern 301 of electromagnetic energy, a second radiation pattern 302, a third radiation pattern 303, a fourth radiation pattern 304, and an omnidirectional radiation pattern 305, respectively. Each directional antenna may be able to transmit with a 10 dB increase in RF energy compared to the omnidirectional antenna, and be directed in one of four directions in the present embodiment, as illustrated by the radiation patterns.

In one embodiment, the first antenna 248A may radiate electromagnetic energy in a first direction, the second directional antenna 248B may radiate electromagnetic energy in a second direction, the third directional antenna 248C may radiate electromagnetic energy in a third direction, and a fourth directional antenna 248D may radiate electromagnetic energy in a fourth direction. The radio may transmit over any of the directional antennas or the omnidirectional antenna and may receive over any of the directional antennas or the omnidirectional antenna.

FIG. 3B is a wireless signal diagram illustrating radiation patterns associated with a multiple radio antenna matrix 350 according to one embodiment. The multiple radios may include the first radio 204A, the second radio 204B, the third radio 204C, and the fourth radio 204D, which may be coupled to each other and where the multiple radio antenna matrix 350 may represent the radio/antenna matrix 210 (FIGS. 1A and 1C). In various embodiments, the multiple radio antenna matrix 350 may include the omnidirectional antenna 246, the first directional antenna 248A oriented in the first direction, the second directional antenna 248B oriented in the second direction, the third directional antenna 248C oriented in the third direction, the fourth directional antenna 248D oriented in the fourth direction, a fifth directional antenna 248E oriented in one of the first direction or a fifth direction, and a sixth directional antenna 248F oriented in one of the third direction or a sixth direction. The fifth and sixth directions may, therefore, be different than the first, second, third, and fourth directions. These antennas may generate an omnidirectional radiation pattern 305, a first radiation pattern 301, a second radiation pattern 302, a third radiation pattern 303, a fourth radiation pattern 304, a fifth radiation pattern 311, a sixth radiation pattern 313, respectively.

As the multiple radio antenna matrix 350 is coupled to four different radios, the first WAP device 102 may selectively control one switch or a series of cascaded switches of the antenna switches 242 to dynamically select a different antenna path and co-transmit in both the phase and frequency domain. For example, the first radio 204A may transmit on the first directional antenna 248A while the second radio 204B transmits on the fourth directional antenna 248D at the same frequency. Further by way of example, the third radio 204C may transmit on the second directional antenna 248B while the fourth radio 204D transmits on the third directional antenna 248C at a different, or second, frequency.

In some embodiments, the antenna path routing may be selected by the switches 242 controlled by hardware level GPIOs, e.g., within the GPIO multiplexer 238. This allows per-frame arbitration on both transmit and receive directions. For example, the first radio 204A may transmit frame A to station A on the first directional antenna 248A and transmit frame B to station B on one of the second directional antenna 248B, the third directional antenna 248C, or the fourth directional antenna 248D.

With additional reference to FIG. 2A, the channel preference list 217 may be a lookup table (or other data structure or object) that lists channels according to priority and maps those channels to a primary owner (e.g., a primary WAP device of the multiple WAP devices) and information associated with establishing (or initiating) the channel as shown in Table 1. The information associated with establishing the channel may include identifiers associated with a radio and an antenna to be coupled to the radio for operation of the channel. Accordingly, as per Table 1, channel one ("1") may be owned by WAP device 1 (e.g., the first WAP device 202), and may be established via a first radio (e.g., radio A) and a first directional antenna (e.g., DA_1) selectively coupled to the first radio.

In embodiments, each radio may lock the antenna switch (or cascaded set of switches) just before frame transmission and release the lock after the last bit is transmitted, e.g., after completion of transmission of the frame. As the Wi-Fi® protocol is half-duplex, locking may be performed via message exchange of the Wi-Fi® SoC 134 to internal switching logic of the Wi-Fi® SoC. Accordingly, an antenna switch of the Wi-Fi® SoC may be automatically locked during transmission of the frame. Alternatively, when controlling antenna switches external to the Wi-Fi® SoC 134 (such as the antenna switches 242 illustrated in FIG. 1C), the Wi-Fi® SoC 134 may send hardware control signals to the antenna switches 242 to lock the antenna switches during transmission of the frame, e.g., via GPIO signals or inter-integrated circuit (I2C) signals.

In this way, transmission and reception of frames of streaming data may be multiplexed between channels to operate over more than one channel at a time. In one embodiment, the first WAP device 202 may own channel one (in operation as a primary WAP device) and may concurrently operate on channel two as a secondary device to on a second channel owned and operated by the second WAP device 202A. As discussed, channel one and channel two may be DFS channels or may be non-DFS channels or a combination thereof. With continued reference to Table 1, if the first WAP device detects a radar event on channel one (e.g., a DFS channel in this case), the next channel to which to move is channel two. In this case, the second WAP device (WAP device 2) will become the primary owner and will operate on channel two with a second radio (e.g., radio B) coupled to a second directional antenna (e.g., DA_2).

Figure 4A:
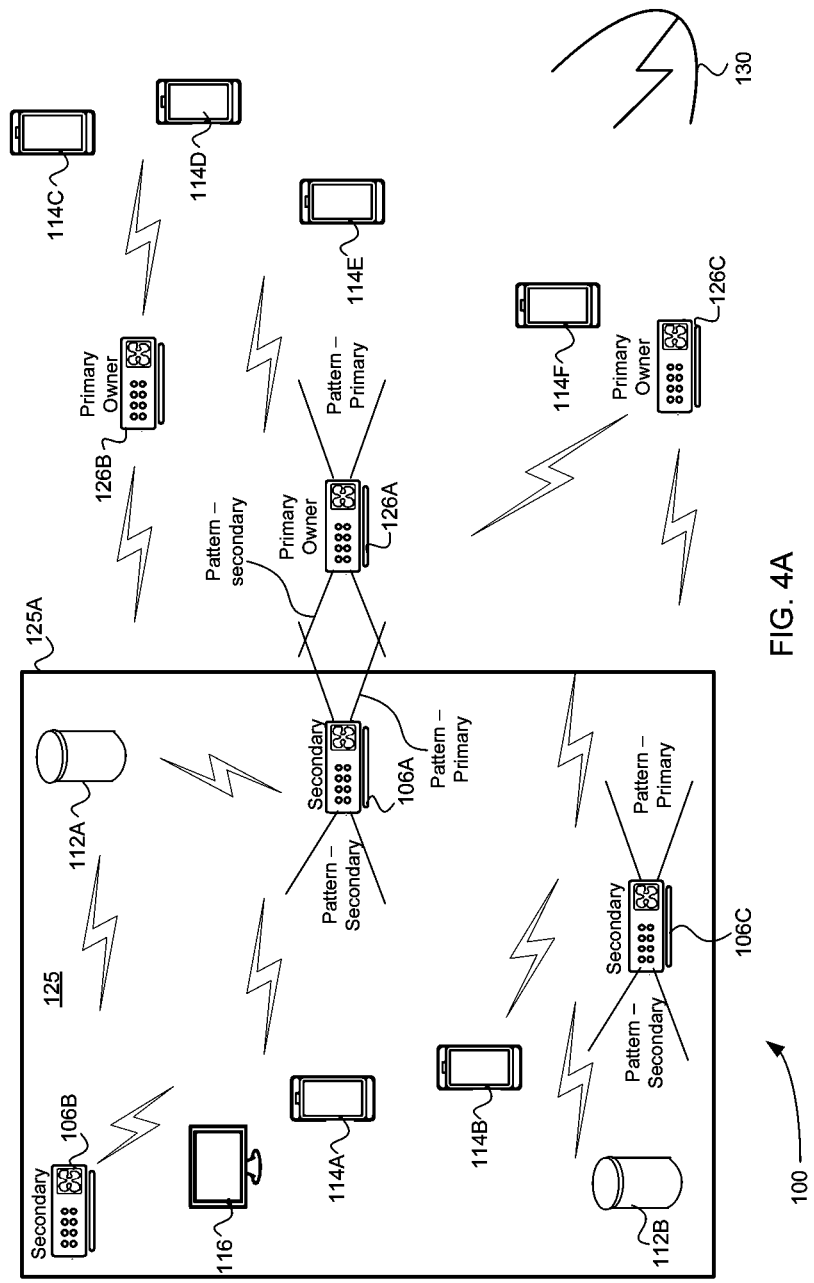
FIGS. 4A and 4B are the network diagram of FIG. 1B that further illustrates assignment of WAP devices as primary or secondary, and antenna radiation patterns associated with particular channels of the WAP devices according to an embodiment.
Figure 4B:
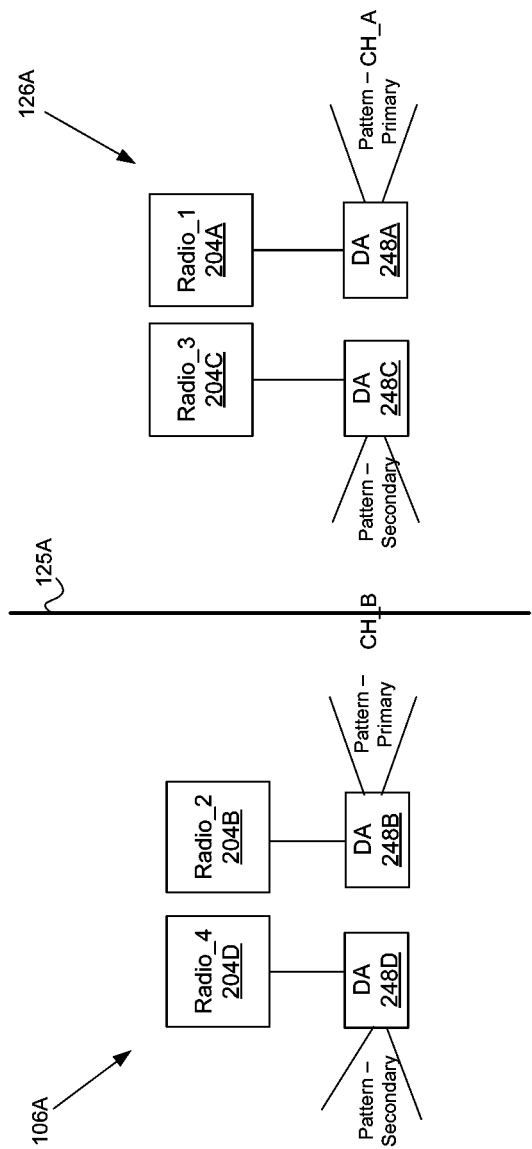

FIGS. 4A and 4B are the network diagram of FIG. 1B that further illustrates assignment of particular WAP devices as a primary device or a secondary device, and antenna radiation patterns associated with particular channels of the WAP devices according to an embodiment. In a traditional DFS system, all nodes perform their own DFS detection and avoidance of radar. The problem with doing this is that the inner nodes placed inside of the building 125 (e.g., second WAP device 106A, the fourth WAP device 106B, and the sixth WAP device 106D) are usually placed in crowded areas serving multiple client wireless devices, as illustrated. Because of channel crowding, the inner nodes have a high probability of false radar detection due to adjacent channel interference and hidden node interference. The channel crowding may be due to inner nodes being near other nodes (e.g., access points) and which are typically backhaul nodes that do not need to be primary devices for purposes of DFS capability.

The nodes outside of the building 125, on the other hand, are referred to as edge nodes (e.g., the first WAP device 126A, the third WAP device 126B, and the fifth WAP device 126C) and are more likely to accurately detect a radar event may be designated as primary owners. Furthermore, in some situations, edge nodes are better suited for moving channels (e.g., may have unused channels or less bandwidth demand). The multi-mode frequency selection system 200 operational within the WMN 100 may facilitate the assignment of edges nodes as primary owners with DFS detection and avoidance capability. Further, the inner nodes may be assigned as secondary devices.

Due to the multi-mode DFS capability in the multi-mode frequency selection system 200, not all nodes need to perform DFS functionality. The server 250 may utilize the distributed placement of the multiple WAP devices (e.g., nodes in the WMN 100) to decide which WAP devices to provide the DFS functionality for the system 200 as a whole. This allows the edge nodes, for example, to be assigned as primary owners that serve the inner nodes, which may be designated as secondary devices. The term "serve" refers to providing Internet (or network) access to nodes and/or client devices. In various embodiments, the server 250 determines the distributed placement of the WAP devices and in relation to different structures, such as the outer wall 125A of the building 125, by way of the network topology information 262. Accordingly, the network topology information 262 includes not only the locations of the WAP devices (e.g., a GPS coordinate or the like), but also their locations relative to structures in their environment. In one embodiment, the server 250 determines the locations of structures by way of topological map data imported into the server 250. In another embodiment, the server 250 alternatively or additional references RSSI data to help determine relative locations of structures to the WAP devices. The RSSI data may be received from the WAP devices, e.g., in response to occasional probing signals sent out by the various WAP devices. The server 250 may resolve ambiguity as to structure presence by cross-association of RSSI data received from different directions by different WAP devices, and optionally as received by different directional antennas of the different WAP devices. Use of RSSI data in conjunction with topological map data map enable more up-to-date network topology information 262 as construction and renovations may change the locations of different structures, and add or remove structures from the environment of the WAP devices.

As discussed, the selection of a WAP device as a primary device or a secondary device and designation of channel ownership may be determined on a per-channel basis. For example, the server 250 may determine, based on the data stored in the memory device 260 (FIG. 2A) such as the network topology information 262, that the first WAP device 126A is to be a primary owner (e.g., of a first DFS channel, or CH_A) due to being located outside of the building, the second WAP device 106A is to be a secondary device due to being located inside the building, the third WAP device 126B is to be a primary owner (e.g., of a third DFS channel), the fourth WAP device 106B is to be a secondary device, the fifth WAP device 126C is to be a primary owner (e.g., of a fourth DFS channel), and the sixth WAP device 106C is to be a secondary device.

The server 250 may further analyze the directionality of the directional antennas associated with respective ones of the multiple WAP devices, and assign an antenna path associated with each channel ownership assignment. In various embodiments, the directionality of a directional antenna is known based on relative placement of the WAP device combined with connection strength to neighbor WAP devices on multiple directional antennas of the WAP device. Further, RSSI strength with relation to known structures within the network topology information 262 may allow determination of at least a relative direction of any particular directional antenna. With additional reference to FIG. 4B, the first radio 204A and the first directional antenna 248A of the first WAP device 126A may be selected to operate the first DFS channel (CH_A) owned by the first WAP device 126A because they may be coupled and because the first directional antenna is directed away from the outer wall 125A of the building 125. Each of the WAP devices of the edge nodes may own at least one DFS channel that is operated by a radio and a directional antenna that is directed away from the building 125. The client wireless devices, such as the client wireless device 114E, in the vicinity of the first WAP device 126A may connect to the WMN 100 on the first DFS channel. The second WAP device 106A may also operate as a secondary device on the first DFS channel.

According, in one embodiment, the server 250 (e.g., computing device) is communicatively coupled to multiple WAP devices within the WMN 100. The processing device determines, using the network topology information, the first WAP device 126A of the plurality of WAP devices is located outside of a building. The processor 252 (or other processing device) may assign the first WAP device as a primary owner with DFS capability. The first WAP device may include a first radio and a first directional antenna. The processing device may further determine that the first directional antenna is directed away from an outer wall of the building 125 using the network topology information 262. The processing device may further assign the first radio as a primary device on a first DFS channel and assign a first directional antenna to be coupled to the first radio. The processing device may further transmit, to the first WAP device, a first message with first assignment information regarding the first WAP device being assigned as the primary owner, the first radio being assigned as a primary device on the first DFS channel, and the first directional antenna being coupled to the first radio. In other embodiments, the cloud computing system of the server 250 transmits DFS control information to the first WAP device, wherein the DFS control information includes first information that assigns the first WAP device as primary owner, second information that assigns the first radio as a primary device on the first DFS channel, and third information that assigns the first directional antenna to be coupled to the first radio.

Similarly, in a compatible embodiment and with additional reference to FIG. 4B, the second radio 204B and the second directional antenna 248B of the second WAP device 106A are selected as a primary device on a second DFS channel (e.g., CH_B). The server 250 may assign a second radio 204B and the second directional antenna 248B of the second WAP device 106A as a primary device on the second DFS channel of the second WAP device 204B because they may be coupled and because the second directional antenna 248B is directed toward the outer wall 125A, e.g., from the inside of the building 125.

Accordingly, in the compatible embodiment, the processing device is further to determine, using the network topology information, the second WAP device 106A of the multiple WAP devices is located inside of the building. The second WAP device includes at least a second radio and a second directional antenna. The processing device may determine that a radiation pattern of the second directional antenna is directed towards the outer wall of the building.

The processing device may further assign the second WAP device 106A as a secondary device. The processing device may further assign the second radio as owner on a second DFS channel of the second WAP device and assign the second directional antenna to be coupled to the second radio. The processing device may then transmit, to the second WAP device, a second message with second assignment information regarding the second WAP device being assigned as a secondary device, the second radio being assigned as a primary device on the second DFS channel, and the second directional antenna being coupled to the second radio.

In a further embodiment, the server 250 may assign the third radio 204C of the first WAP device to operate as a secondary device on the second DFS channel, which the second WAP device 106A owns. The server may 250 may further assign the third directional antenna 248C, of the first WAP device 126A, to be coupled to the third radio 204C. A radiation pattern of the third directional antenna 248C can also be directed towards the outer wall 125A of the building 125. The server 250 may further transmit, within the first message to the first WAP device 126A, additional assignment information regarding the third radio being assigned to operate as a secondary device on the second DFS channel and the third directional antenna being coupled to the third radio. In various embodiments, assignments as a primary owner, as a secondary device, or as a primary device or a secondary device on a particular channel, may be directed within a message by the server 250 as a bit, as packaged code, or within an operand of a computer instruction to be executed on the respective WAP devices being assigned. Other ways of transmitting the assignment, such as in a command or in a larger data packet used to program the WAP devices, are also envisioned.

With additional reference to FIG. 2A, the server 250 may store a data structure within the memory device 260 that stores the network topology information 262 and another data structure (or potentially the same data structure) that stores the assignment information related to assignments of a radio and a directional antenna for a particular channel. In one embodiment, the server 250 stores a table of primary device assignment information, a table of radio assignment information, and a table of antenna assignment information. Alternatively, the server 150 may store a data structure with a record storing all three of these types of information and a second record that stores the assignments for another device. Alternatively, server 250 may store a record for the WMN 100 with all of the WAP devices, radio, and antenna assignments indexed according to WAP device and available channels, such as variables that define each of the assignable attributes. One example of the latter is illustrated in Table 1 with reference to the channel preference list 217, although without necessarily listing the assignments in order of any preference.

The server 250 may further use the historic radar event data 264 to decide the primary owner selection based on the primary owner's placement, links to other nodes, and past the historical radar event data 264. For example, the server 250 may identify an airport or radar tower as the radar source 130. Use of the radar source 130 may be fixed in channel and time of use, so the server 250 may avoid that channel during certain time periods of normal use. Due to a large deployment of the radar source 130, the server 250 may detect a location of the radar source 130 or simply retrieve its location from another data source. If the server 250 detects radar signals on channel 60 via a WAP device located at one corner of WMN 100, for example, the server 250 can move use of channel 60 to another WAP device located at an opposite corner of WMN 100, and thereby avoid the radar on channel 60. For example, moving the location of the primary WAP device that owns channel 60 may force the radar signals that are detected below the interference detection threshold for radar under DFS.

In further embodiments, the server 250 may analyze the distribution of the WAP devices (e.g., from the network topology information) and group secondary WAP devices with one or more primary WAP devices in certain areas and in a way that does not overload the channels (e.g., the available radios and antennas) of any particular primary WAP device. This kind of data may allow for the intelligent assignment, by the server 250, of certain WAP devices to be primary devices and others to be secondary devices. In one embodiment, for example, primary WAP devices that encounter high frequency of radar events are identified and additional WAP devices (e.g., secondary nodes) in the same cluster of WAP devices are selected to assist the monitoring of the high radar event channels to reduce the effect of false detect and to elect a new primary owner for that channel. The server 250 may also decide to abandon channels that reference a large number of radar events (in the historical radar event data 264) for the multi-mode frequency selection system.

The server 250 may also schedule a primary owner rotation or a primary owner duplication to avoid single point of failure on radar detection and reduce false detects. Accordingly, the server 250 may schedule rotation of assignment as primary owner to a number of WAP devices, e.g., from assignment to the first WAP device 126A to the second WAP device 106A at a first time, and from assignment to the second WAP device 106B to the third WAP device 126B at a second time.

The server 250 may also receive, from the first WAP device 126A, a notification that the first WAP device has stopped transmitting on the first DFS channel, e.g., in response to a radar event. The server 250 may further determine, based on the historical DTR associated with the first WAP device, that the first WAP device 126A stops transmitting data during a time period, e.g., an idle period of network activity associated with the first WAP device 126A. The server 250 may detect low DTR that indicates the idle period on per-channel basis within the historical DTR 266, which may be monitored within data received from the WAP devices, including the first WAP device 126A. The server 250 may further direct (or cause) the first WAP device 126A to restart transmitting on the first DFS channel via performance of a channel availability checks (CAC) during the idle time period.

The server 250 may further receive, from the multiple WAP devices, available channels and store, in the memory 230, the available channels in an available channel list. The server 250 may determine, based on the per-channel data transfer rate (DTR) described above, a second WAP device of the WMN has one or more unused radios. For example, if the DTR on a channel is below a threshold low usage level, the radio may be considered as "unused." The server 250 may further assign a second radio of the one or more unused radios of the second WAP device to perform in-service monitoring on the first DFS channel on behalf of the first WAP device (assuming the first WAP device is still a primary device on the first DFS channel). The server 250 may then transmit, to the second WAP device, a second message including information regarding the first radio being assigned to perform the in-service monitoring on the first DFS channel.

Figure 5A:
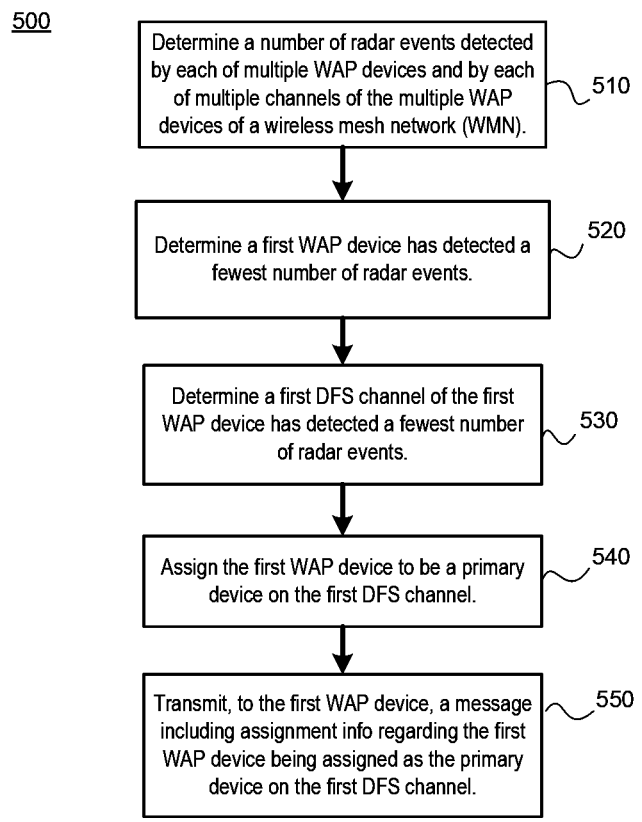
FIG. 5A is a flow chart of a method of assigning a WAP device within a WMN that has detected the fewest number of radar events to be a primary device and as an owner of a first dynamic frequency selection (DFS) channel according to an embodiment.

FIG. 5A is a flow chart of a method 500 of assigning a WAP device within a WMN that has detected the fewest number of radar events to be a primary device and as an owner of a first dynamic frequency selection (DFS) channel according to an embodiment. Method 500 may be performed by processing logic that may comprise hardware (e.g., circuitry, dedicated logic, programmable logic, microcode, etc.), software (such as instructions running on the processor), firmware or a combination thereof. In one embodiment, processor 252 of the server 250 within the multi-mode frequency selection system 200 performs the method 500. Alternatively, one of the WAP devices may perform some or all of the operations of the method 500.

With reference to FIG. 5A, the method 500 may begin with the processing logic determining, by a cloud computing system over a communication interface over time, a number of radar events detected via each of multiple wireless access point (WAP) devices of a wireless mesh network (WMN) and by each channel associated with respective ones of the plurality of WAP devices (510). For example, the processing logic may determine a first number of radar events detected by a first WAP device, a second number of radar events detected by a second WAP device, and a third number of radar events detected by a third WAP device. The number of radar events may be monitored over time and/or may be derived from the historical radar event data 264, which may be stored in relation to channels of respective WAP devices (FIG. 2A). The method 500 may continue with the processing logic determining, using the first number, the second number, and the third umber of radar events, a first WAP device of the plurality of WAP devices has detected a fewest number of radar events (520). The method 500 may continue with the processing logic determining, using the historical radar event data for the first WAP device, that a first DFS channel of the first WAP device has detected a fewest number of radar events when compared with a number of radar events detected by other available DFS channels of the first WAP device (530). In an additional or alternative embodiment, the radar events are detected as being false detections or the false detections are included within the number of radar events (e.g., as false radar events) that considered for determining which WAP device or DFS channel has detected the fewest number of overall radar events.

With additional reference to FIG. 5A, the method 500 may continue with the processing logic assigning the first WAP device to be a primary device on the first DFS channel (540). The method 500 may continue with the processing logic transmitting, to the first WAP device using a communication interface, a message with assignment information regarding the first WAP device being assigned as the primary device on the first DFS channel (550). In this way, the DFS channel on a particular WAP device that historically detects the fewest number of radar events (which or may or may not include false radar events) may be a primary device, to reduce the probability of channel switching away from a DFS channel on primary WAP device.

Figure 5B:
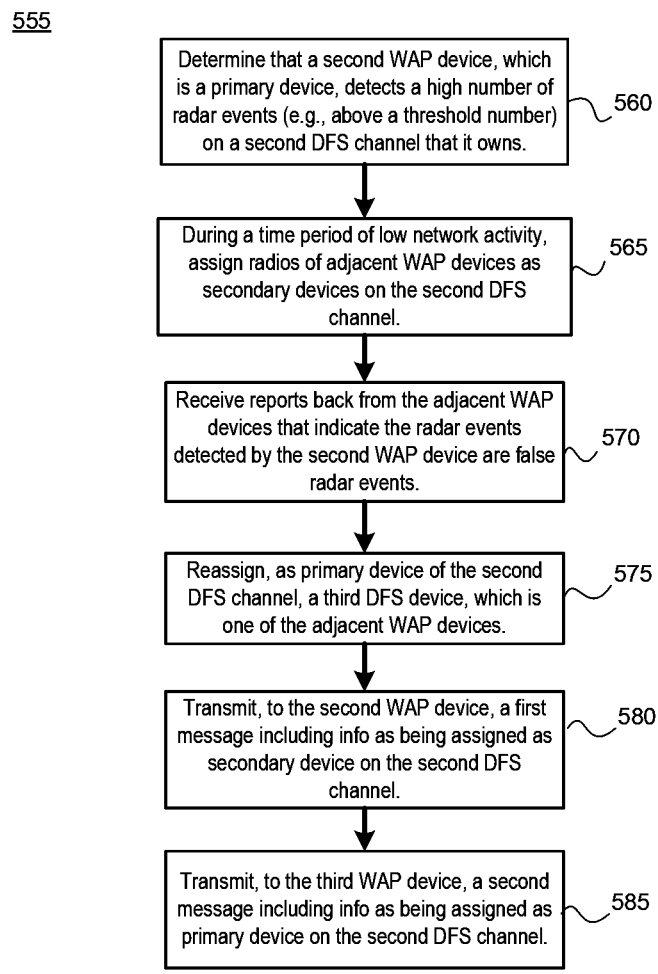
FIG. 5B is a flow chart of a method of reassignment of a primary device on a second DFS channel as a secondary device in response to confirmation that the primary WAP device detected a high number of false radar events on the second channel according to an embodiment.

FIG. 5B is a flow chart of a method 555 of reassignment of a primary device on a second DFS channel as a secondary device in response to confirmation that the primary WAP device detected a high number of false radar events on the second channel according to an embodiment. Method 555 may be performed by processing logic that may comprise hardware (e.g., circuitry, dedicated logic, programmable logic, microcode, etc.), software (such as instructions running on the processor), firmware or a combination thereof. In one embodiment, processor 252 of the server 250 within the multi-mode frequency selection system 200 performs the method 555. Alternatively, one of the WAP devices may perform some or all of the operations of the method 555.

With reference to FIG. 5B, the method 555 may begin with the processing logic determining that a second WAP device, which is a primary owner, detects a high number of radar events on a second DFS channel that it owns (560). In one embodiment, the high number of radar events is above a threshold number that is typical of other WAP devices within a cluster of WAP devices of the WMN. The method 555 may continue with the processing logic, during a time period of low network activity, assigning radios of adjacent WAP devices as secondary owners on the second DFS channel (565). In this way, the secondary owners (adjacent WAP devices) may perform CAC on the second DFS channel; or, if the second WAP device is already performing CAC on the second DFS channel, the adjacent WAP device may perform ISM on the second DFS channel. The method 555 may continue with the processing logic receiving reports from the adjacent WAP devices that indicate the radar events detected by the second WAP device are false radar events (570). For example, the reports may be "NO" responses to a radar event packet (REP) as will be discussed with reference to FIG. 9B, in which adjacent Nodes B, C, and D respond that no radar event was detected.

With additional reference to FIG. 5B, the method 555 may continue with the processing logic reassigning, as primary owner of the second DFS channel, a third WAP device, which is one of the adjacent WAP devices (575). The method 555 may continue with the processing logic transmitting, to the second WAP device, a first message including information that the second WAP device has been assigned as a secondary device on the second DFS channel (580). The method 555 may continue with the processing logic transmitting, to the third WAP device, a second message including information that the third WAP device has been assigned as primary device on the second DFS channel (585). In this way, the server 250 (or other cloud computing device) may act on data indicative that a primary owner of a DFS channel is detecting a number of false radar events, and reassign that primary owner as a secondary device on the DFS channel being impacted by false radar detections.

Figure 6:
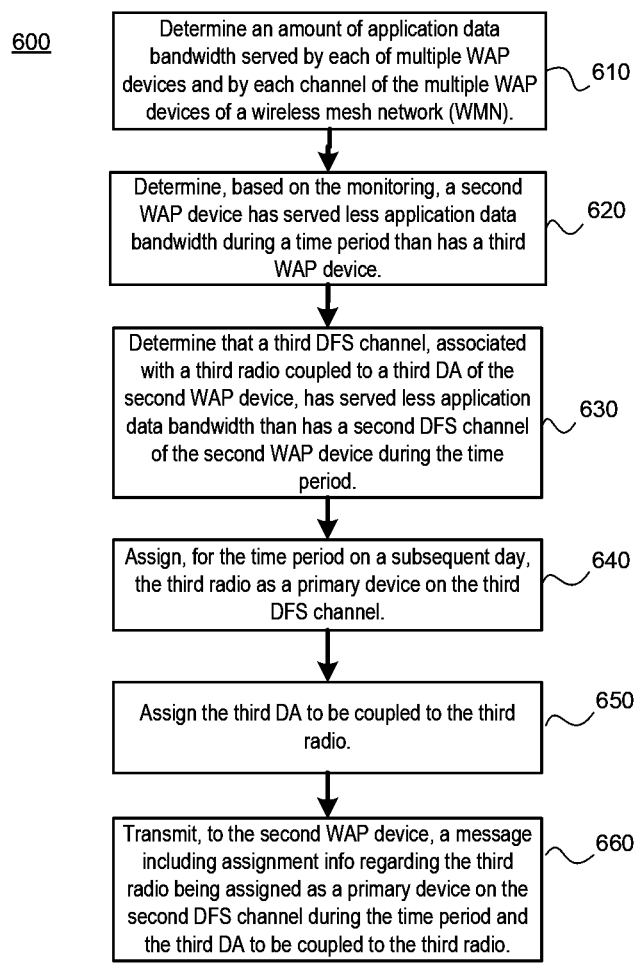
FIG. 6 is a flow chart of a method of assigning a WAP device within a WMN that has streamed the most data during a time period to be a primary owner of a channel that has streamed the most data during the time period according to an embodiment.

FIG. 6 is a flow chart of a method 600 of assigning a WAP device within a WMN that has streamed the most data during a time period to be a primary owner of a channel that has streamed the most data during the time period according to an embodiment. Method 600 may be performed by processing logic that may comprise hardware (e.g., circuitry, dedicated logic, programmable logic, microcode, etc.), software (such as instructions running on the processor), firmware or a combination thereof. In one embodiment, processor 252 of the server 250 within the multi-mode frequency selection system 200 performs the method 600. Alternatively, one of the WAP devices may perform some or all of the operations of the method 600.

With reference to FIG. 6, the method 600 may begin with the processing logic determining, by the processing device, a data transfer rate (DTR) served by each of multiple WAP devices and by each channel associated with respective ones of the multiple WAP devices (610). The DTR served by respective ones of the plurality of WAP devices may be determined with reference to the historical DTR 266, which may be stored in relation to channels of respective WAP devices (FIG. 2A). For example, the processing logic may determine, during a time period, a first DTR served by a second WAP device of the WMN and a second DTR served by a third WAP device of the WMN. The method 600 may continue with the processing logic determining, based on the monitoring, a second WAP device of the WMN has detected more DTR during a time period than has a third WAP device of the plurality of WAP devices (620). For example, the processing logic may determine that the first amount is less than the second amount. Optionally, the second WAP device may have served the least DTR during the time period. The method 600 may continue with the processing logic determine that a third DTR served on a third DFS channel of the second WAP device is less than a fourth DTR served on a second DFS channel of the second WAP device, wherein the third DFS channel operated on a third radio coupled to a third directional antenna (630). Optionally, the third radio and the third directional antenna may have served the least amount of DTR during the time period.

With additional reference to FIG. 6, the method 600 may continue with the processing logic assigning, for the time period on a subsequent day, the third radio as a primary device on the third DFS channel (640). The method 600 may continue with the processing logic assigning the third directional antenna to be coupled to the third radio (650). The method 600 may continue with the processing logic transmitting, to the second WAP device, a message with second assignment information regarding the third radio being assigned as a primary device on the second DFS channel during the time period and the third directional antenna to be coupled to the third radio (660).

Figure 7:
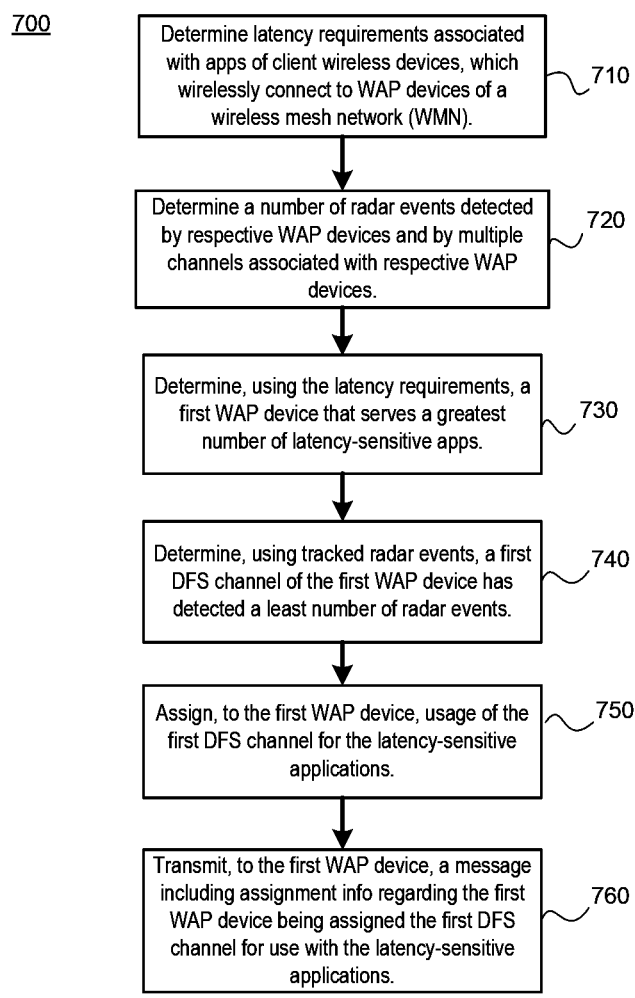
FIG. 7 is a flow chart of a method of assigning a WAP device within a WMN that serves the highest number of latency-sensitive application as a primary device according to an embodiment.

FIG. 7 is a flow chart of a method 700 of assigning a WAP device within a WMN that serves the highest number of latency-sensitive application as a primary device according to an embodiment. Method 700 may be performed by processing logic that may comprise hardware (e.g., circuitry, dedicated logic, programmable logic, microcode, etc.), software (such as instructions running on the processor), firmware or a combination thereof. In one embodiment, processor 252 of the server 250 within the multi-mode frequency selection system 200 performs the method 700. Alternatively, one of the WAP devices may perform some or all of the operations of the method 700.

With reference to FIG. 7, the method 700 starts with the processing logic determining latency requirements associated with applications of client wireless devices, which wirelessly connect to a plurality of wireless access point (WAP) devices of a mesh network (710). In one embodiment, the latency requirements of the applications are determined from the historical latency requirement information 268, which may be stored in relation to channels of respective WAP devices (FIG. 2A). The method 700 may continue with the processing logic determining a number of radar events detected respective WAP devices and by multiple channels associated with respective WAP devices (720). The method 700 may continue with the processing logic determining, based on the latency requirements, a first WAP device of the MWN that serves a greatest number of latency-sensitive applications (730). The method 700 may continue with the processing logic determining, using tracked radar events, a first DFS channel of the first WAP device has detected a fewest number of radar events when compared with a number of radar events detected by other DFS channels of the first WAP device (740). The method 700 may continue with the processing logic assigning, to the first WAP device, use of the first DFS channel for the latency-sensitive applications (750). The method 700 may continue with the processing logic transmitting, to the first WAP device using a communication interface, a message with second assignment information regarding the first WAP device being assigned the first DFS channel for use with the latency-sensitive applications (760).

Further, the processing logic may determine that a first radio, of the first WAP device, is associated with the first DFS channel and that a first directional antenna, which is selectively coupled to the first radio, has detected a fewest number of radar events compared to other directional antennas selectively coupled to the first radio. In one embodiment, the message further includes information regarding the first directional antenna to be coupled to the first radio.

Figure 8:
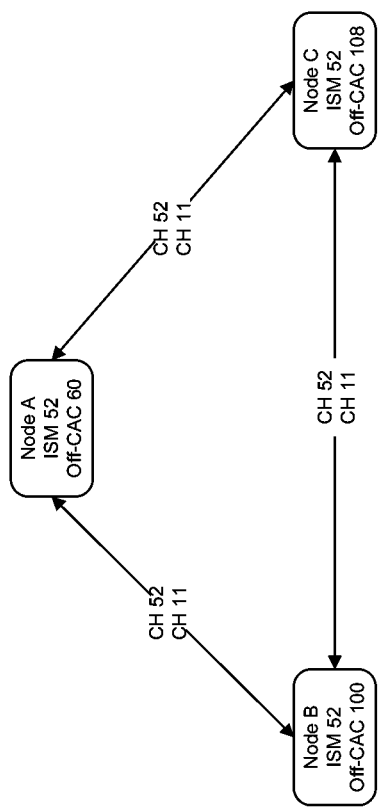
FIG. 8 is a network diagram that illustrates three neighbor WAP devices within a WMN according to an embodiment.

FIG. 8 is a network diagram that illustrates three neighbor WAP devices within a WMN according to an embodiment. The three neighbor WAP devices are labeled as Node A, Node B, and Node C. Each node may have two or more command paths with another multi-mode node such that, in the event of a node has to vacate the channel due to detecting a radar event, the node may communicate the vacate reason (e.g., presence of radar) and the new channel to its neighbor nodes (e.g., the nodes wirelessly connected).

Because the multiple WAP devices in the multi-mode frequency selection system 200 are multi-mode capable, each primary node may detect the presence of radar interference for one or more channels, thus allowing a primary node to open up more than one DFS channel to the WMN 100. Further, the primary node may perform in-service monitoring (ISM) on its home channel while scheduling off-channel channel availability check (CAC) on a different channel. For example, with reference to FIG. 8, Node A may perform off-channel CAC on channel 60, Node B may perform off-channel CAC on channel 100, and Node C may perform off-channel CAC on channel 108. Using off-channel CAC, the multi-mode WAP devices may have multiple DFS channels available as backup channels in the case of a radar event. The off-channel CAC may be performed on a second radio and second coupled antenna, assuming the home channel is operated over a first radio coupled to a first antenna.

Furthermore, upon detecting a radar event, an originator WAP device (e.g., originator node that detects the radar event) pauses data transmissions, broadcasts the channel, moves information in its beacon in the form of a Channel Switch Announcement to inform proximity neighbors, and generates a radar event packet (REP). The REP may include, for example, the channel of radar detected, the node's origin medium access control (MAC address), the new proposed channel, radar event time, and channel move time. The originator WAP device may propagate the REP throughout the WMN 100. Each receiving WAP device is to respond with a response REP packet with its own MAC address, whether it has detected radar on the same channel, and its physical distance from the originator WAP device. A WAP device that receives the REP may also add its own radar detection metric and relay the REP throughout the WMN 100. The originator WAP device is to decide within 10 seconds whether to proceed with the channel move or abort the move depending on the REP response packets as will be discussed with reference to FIGS. 9A and 9B.

Each of the WAP devices (e.g., Node A, Node B, and Node C in FIG. 8) may further determine a physical distance from the radar source 130 (FIG. 4A). If Nodes A, B, and C are generally in straight line, and Node A detects radar at −65 dB, Node B may determine its relative physical distance to Node A. Node B may then determine the location of source of radar signal. In an additional embodiment, Node B may analyze RSSI data of radar from the radar source for levels of degradation, and deduce, from known locations of Node A and Node C, its physical distance from the radar source 130. By also determining (or being informed of) the location of the radar source 130, the server 250 may determine which WAP device to assign as a primary device and what directional antenna with which radio to employ on a particular channel to decrease the probability of radar detection by the primary WAP device.

Figure 9A:
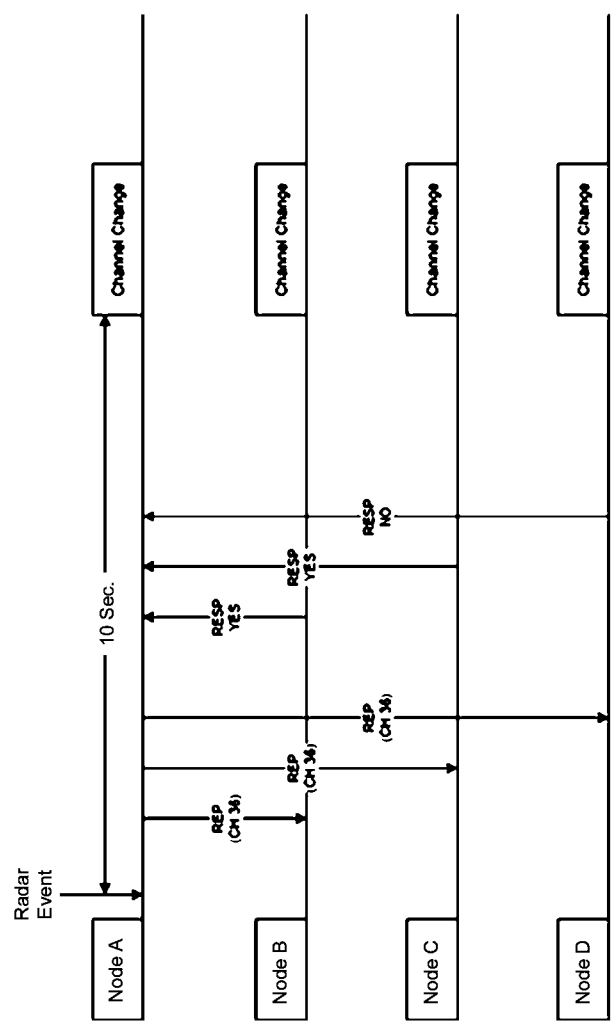
FIG. 9A is a graph that illustrates multiple WAP devices (nodes) within the WMN in which a radar event is confirmed to cause a switch to an alternative channel according to an embodiment.

FIG. 9A is a graph that illustrates multiple WAP devices (nodes) within the WMN 100 in which a radar event is confirmed to cause a switch to an alternative channel according to an embodiment. In one embodiment, assume a first WAP device (e.g., Node A) is the originator WAP device and is wirelessly coupled to a second WAP device (e.g., Node B), to a third WAP device (e.g., Node C), and to a fourth WAP device (e.g., Node D). In response to the detection of the radar event, e.g., on channel 36, the first WAP device may broadcast a first radar event packet (REP) to the second WAP device and to the third WAP device. The first REP may include an identifier of the first DFS channel, an origin medium access control (MAC) address, an identifier of the second DFS channel as a proposed new channel, a time stamp of the radar event, and a channel move time.

In various embodiments, the first WAP device may further receive, in response to the broadcast, a second REP from the second WAP device, the second REP including a second MAC address of the second WAP device, whether the second WAP device detected the radar event, and a first physical distance between the first and second WAP devices. The first WAP device may further receive, in response to the broadcast, a third REP from the third WAP device, the third REP including a third MAC address of the third WAP device, whether the third WAP device detected the radar event, and a second physical distance between the first and third WAP devices. If a fourth node exists, the first WAP device may further receive, in response to the broadcast, a fourth REP from the fourth WAP device, the fourth REP including a fourth MAC address of the fourth WAP device whether the fourth WAP device detected the radar event, and a third physical distance between the first and fourth WAP devices. The first WAP device may further determine, based on the second REP and the third REP (and optionally also the fourth REP), whether the radar event is a false detection of radar and whether to proceed with a channel move to the second DFS channel.

As illustrated in FIG. 9A, each of the second, third, and fourth WAP devices (Nodes B, C, and D) have responded to the first WAP device that the radar event was also detected on channel 36. Accordingly, each of the second, third, and fourth WAP devices is to, in the absence of an abort command before the channel move time, move to communicate with the first WAP device over the second DFS channel.

Figure 9B:
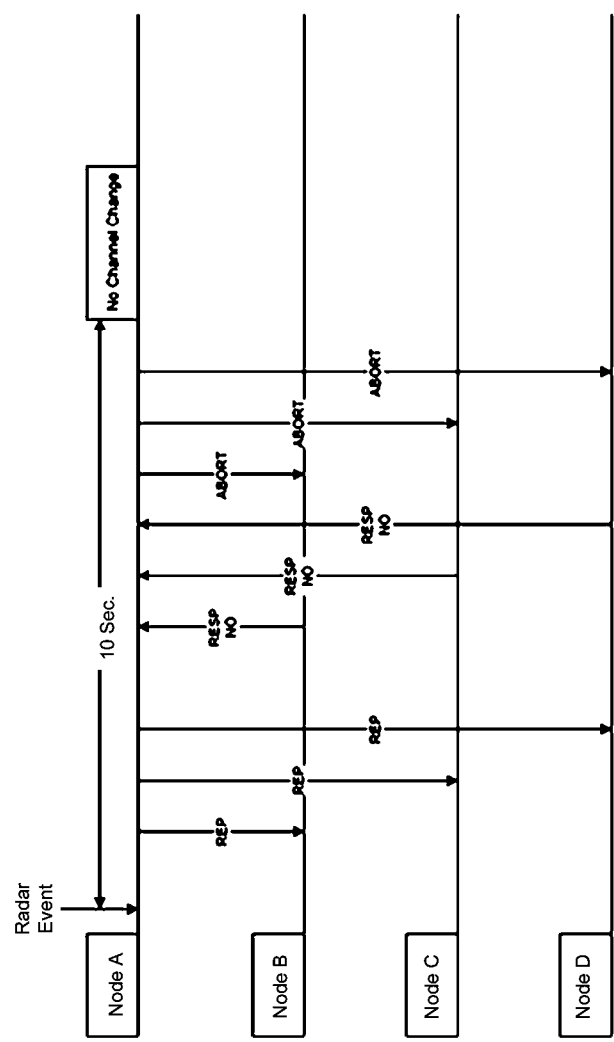
FIG. 9B is a graph that illustrates the multiple WAP devices (nodes) of FIG. 9A in which the radar event is determined to be a false detection according to an embodiment.

FIG. 9B is a graph that illustrates the multiple WAP devices (nodes) of FIG. 9A in which the radar event is determined to be a false detection according to an embodiment. For example, each of the second, third, and fourth WAP devices (Nodes B, C, and D) have responded to the first WAP device that the radar event was not detected. Accordingly, in response to an indication in the second REP, the third REP, and the fourth REP that none of the second WAP device, the third WAP device, and the fourth WAP device detected the radar event, the first WAP device is further to a send, to the second, third, and fourth WAP devices, a command to abort movement to the second DFS channel.

Figures 10A, 10B:
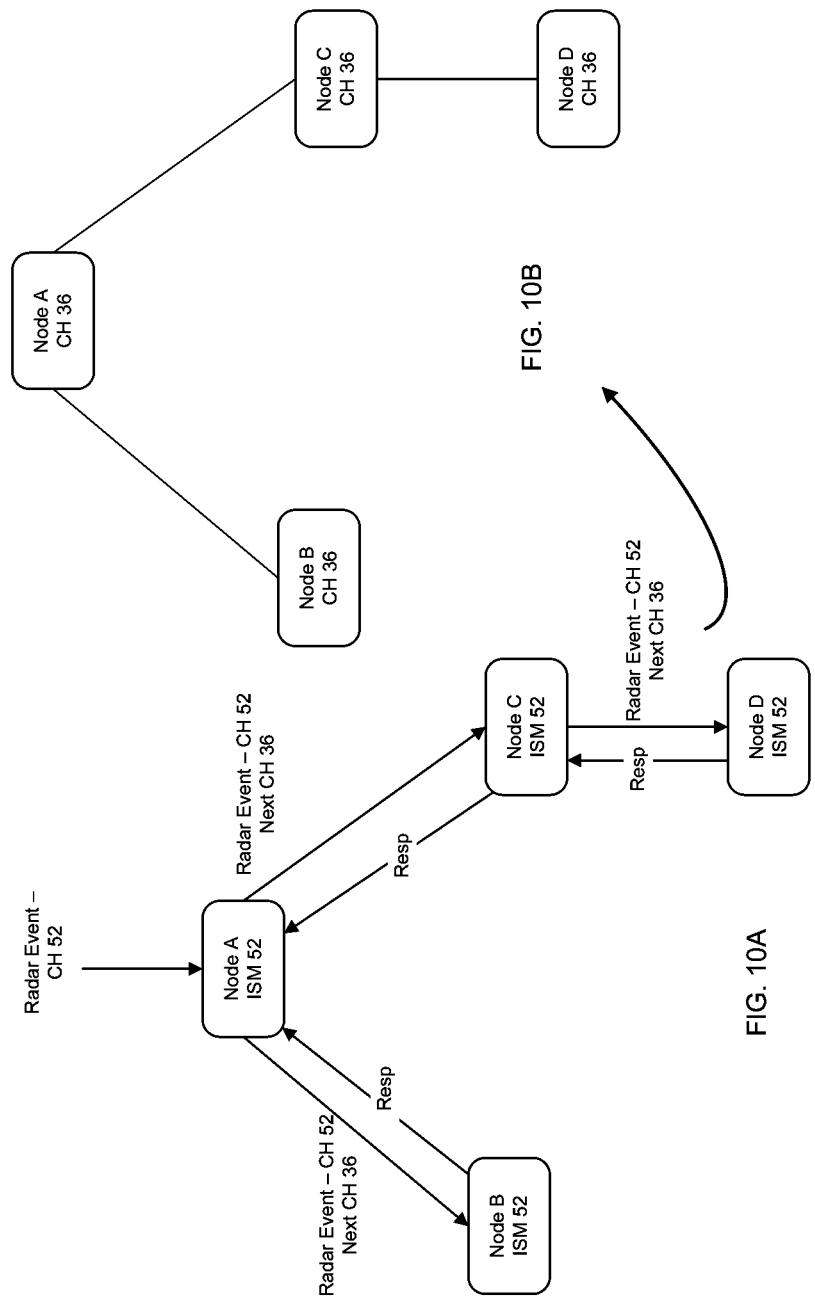
FIGS. 10A and 10B are a network diagram of multiple WAP devices (nodes) within the WMN that illustrates radar event packet propagation between neighbor WAP devices according to an embodiment.

FIGS. 10A and 10B are a network diagram of multiple WAP devices (nodes) within the WMN 100 that illustrates radar event packet propagation between neighbor WAP devices according to an embodiment. For example, assume the multiple WAP devices include Node A that does ISM on channel 52, Node B that performs ISM on channel 52, Node C that perform ISM on channel 52, and Node D that also performs ISM on channel 52. When a radar event is detected, the originator node (e.g., Node) may include the next channel information in the REP and each receiving node is to continue to propagate this next channel information to its neighbor nodes (e.g., those nodes with which the node is wirelessly connected). As illustrated in FIG. 10A, the REP from Node A includes an indicator that a radar event has been detected on channel 52 and a next channel to which to switch is channel 36. Node C may pass the REP from the originator Node A on to Node D, and in this way, the REP is replicator onto the WMN 100. Each of Node B, Node C, and Node D may respond, e.g., as was discussed with reference to FIG. 9A confirming detection of the radar event or as was discussed with reference to FIG. 9B, that the radar event was not detected. In the case of FIG. 9A, each of the Node B, Node C, and Node D moves to channel 36 in the absence of an abort command.

FIGS. 11A and 11B are a network diagram of multiple WAP devices (nodes) within the WMN 100 that illustrates switching to a next channel in response to a radar event and when more than one of the WAP devices is a primary owner according to an embodiment. In the a multi-mode frequency selection system 200, each multi-mode node may act as a primary owner for one or more DFS channels and is responsible for the radar detection decision for those channels. In various embodiments, each primary owner is also to propagate an available channel list to the network, which includes to the server 250.

In FIG. 11A, the initial operating channel between Node A and Node B is channel 52, between Node A and Node C is channel 52, between Node C and Node D is channel 64. With additional reference to FIG. 11B, after a radar event is detected on channel 52, because there are other primary owners (e.g., primary WAP devices), the operating channel between Nodes A and B is changed to channel 132 without the need for the one minute CAC. Observe the responses from each of the Nodes B, C, and D to Node A included its respective available channel list, respectively, channel 52 and 100 (Node B), channels 52 and 108 (Node C), and channels 52 and 132 (Node D). Each channel list of channels 52 and 108 (Node C) and channels 52 and 64 (Node B) is also propagated to Node D. Because Node D was the primary owner of channel 132 before the detection, Nodes A, B, and C may move to operate as secondary devices on channel 132. This change need not affect the communication between Node D and Node C over channel 64, for which Node C is the primary owner.

In some embodiments, nodes that are heavily used, e.g., process heavy data transfer rate (DTR), are to not be employed to perform CAC, which is the most disruptive type of DFS operation. Instead, in the embodiments, nodes that are idle or at least not heavily used may be employed to perform CAC on behalf of nodes that heavily used. The server 250 may analyze the historical DTR 266 to determine which nodes should off-load operation of the CAC to an off-channel radio-antenna combination or to another node that is idle or not heavily used. This type of operation may then be directed to the WAP devices of these two nodes by the server 250 to operate accordingly. The decision of when to direct this operation may be time period dependent as the heavy DTR of a node may occur only during certain times of day, e.g., between 6 to 10 p.m. at night. In an alternative embodiment, for quicker response times in response to detection of heavy usage, the node that is a secondary device on a particular channel may transmit an idle status to a primary node that is heavily used, as is described with reference to FIG. 12.

Figure 12:
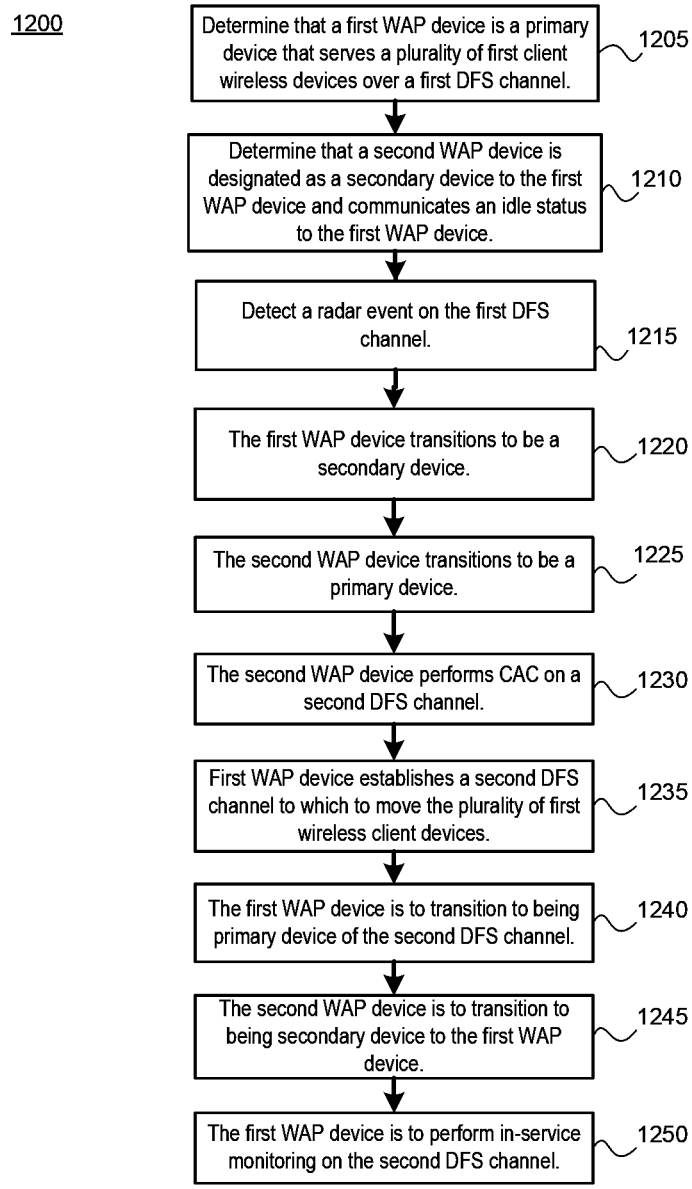
FIG. 12 is flow chart of a method of transitioning, by WAP devices of the WMN in response to a radar event, between being a primary device and a secondary device in order to perform channel availability check (CAC) on a WAP device that is idle according to an embodiment.

FIG. 12 is flow chart of a method 1200 of transitioning, by WAP devices of the WMN 100 in response to a radar event, between being a primary device and a secondary device in order to perform channel availability check (CAC) on a WAP device that is considered idle according to an embodiment. Method 1200 may be performed by processing logic that may comprise hardware (e.g., circuitry, dedicated logic, programmable logic, microcode, etc.), software (such as instructions running on the processor), firmware or a combination thereof. In one embodiment, one or a combination of the multiple WAP devices (also referred to as nodes herein) may perform some or all of the operations of the method 1200.

With reference to FIG. 12, the method 1200 may begin with the processing logic determining a first wireless access point (WAP) device is designated as a primary WAP device that serves a network connection to a plurality of first client wireless devices over a first dynamic frequency selection (DFS) channel (1205). The method 1200 may continue with the processing logic determining a second WAP device is designated as a secondary device to the first WAP device on the first DFS channel, where the second WAP device is to communicate an idle status to the first WAP device (1210). In one embodiment, the idle status is data bandwidth usage, by one or more second client wireless devices, that is below a threshold value.

With continued reference to FIG. 12, the method 1200 may continue with the processing logic detecting a radar event on the first DFS channel (1215). The method 1200 may continue with the processing logic of the first WAP device transitioning to be a secondary device (1220). The method 1200 may continue with the processing logic of the second WAP device transitioning to being a primary device (1225). The method 1200 may continue with the processing logic of the second WAP device performing CAC on a second DFS channel (e.g., any channel that is next on a channel availability list) (1230). The method 1200 may continue with the processing logic of first WAP device establishing the second DFS channel to which to move the plurality of first client wireless devices (1235).

With additional reference to FIG. 12, the method 1200 may continue, in response to completion of the CAC by the second WAP device, with the processing logic of the first WAP device causing the first WAP device to transition to being the primary device, e.g., of the second DFS channel (1240). The method 1200 may continue with the processing logic of the second WAP device causing the second WAP device is to transition to being the secondary device, e.g., of the second DFS channel (1245). The method 1200 may continue with the processing logic of the first WAP device performing in-service monitoring of the second DFS channel (1250).

Figure 13:
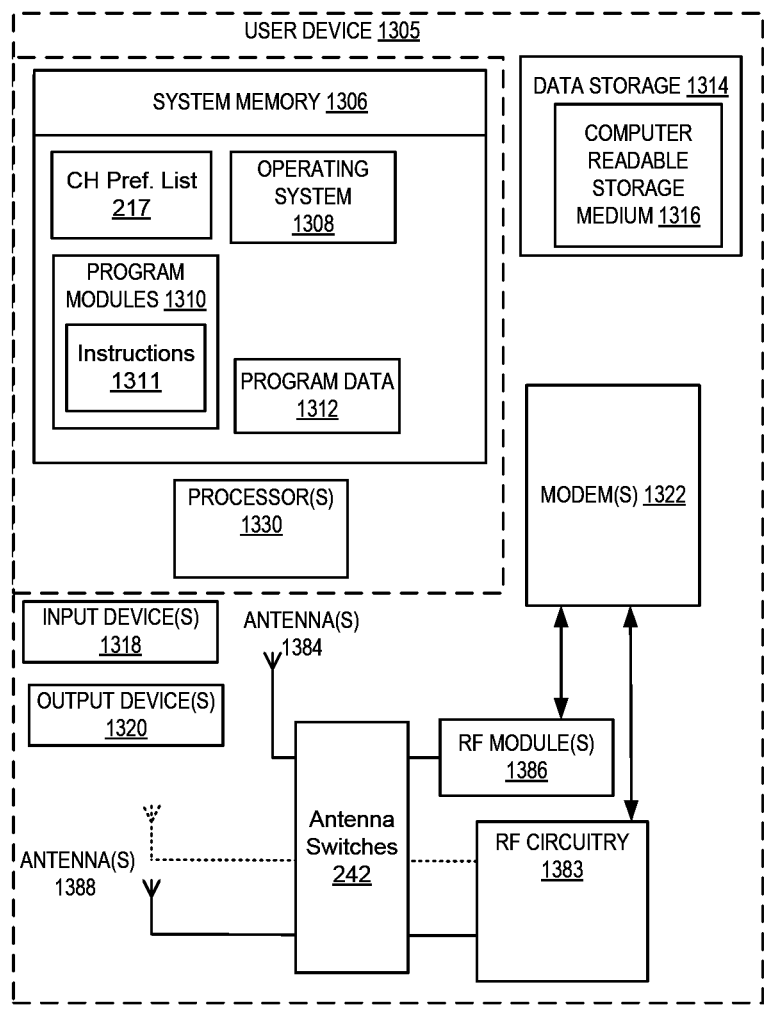
FIG. 13 is a block diagram of a user device in which embodiments of hybrid directional antenna system may be implemented according to various embodiments.

FIG. 13 is a block diagram of a user device 1305 in which embodiments of employing a hybrid directional antenna system may be implemented. The user device 1305 may correspond to the first WAP device 202 or one of the client wireless devices 112, 114, 116 (FIGS. 2A-2C). The user device 1305 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1305 may be any portable or stationary user device. For example, the user device 1305 may be an intelligent voice control and speaker system. Alternatively, the user device 1305 can be any other device used in a WLAN network (e.g., Wi-Fi® network), a WAN network, or the like.

The user device 1305 includes one or more processor(s) 1330, such as one or more CPUs, microcontrollers, field programmable gate arrays, or other types of processors. The user device 1305 also includes system memory 1306, which may correspond to any combination of volatile and/or non-volatile storage mechanisms. The system memory 1306 stores information that provides operating system component 1308, various program modules 1310 (to include instructions 1311 or other code), program data 1312, and/or other components. In one embodiment, the system memory 1306 stores instructions of the methods 1000, 1100, 1105, and 1200 as described herein. The user device 1305 performs functions by using the processor(s) 1330 to execute instructions provided by the system memory 1306, as may be loaded by one of the program modules 1310. The instructions may implement the channel controller 122. The processor(s) 1330 may then retrieve entries from the channel preference list 217 to determine which of multiple antenna (s) 1384 and 1388 to select, via selective control of the antenna switches 242, over which to transmit frames of a data stream and to receive acknowledgements.

The user device 1305 also includes a data storage device 1314 that may be composed of one or more types of removable storage and/or one or more types of non-removable storage. The data storage device 1314 includes a computer-readable storage medium 1316 on which is stored one or more sets of instructions embodying any of the methodologies or functions described herein. Instructions for the program modules 1310 may reside, completely or at least partially, within the computer-readable storage medium 1316, system memory 1306 and/or within the processor(s) 1330 during execution thereof by the user device 1305, the system memory 1306 and the processor(s) 1330 also constituting computer-readable media. The user device 1305 may also include one or more input devices 1318 (keyboard, mouse device, specialized selection keys, etc.) and one or more output devices 1320 (displays, printers, audio output mechanisms, etc.).

The user device 1305 further includes a modem 1322 to allow the user device 1305 to communicate via a wireless network (e.g., such as provided by the wireless communication system) with other computing devices, such as remote computers, an item providing system, and so forth. The modem 1322 can be connected to RF circuitry 1383 and zero or more RF modules 1386. The RF circuitry 1383 may be a WLAN module, a WAN module, PAN module, or the like. Antennas 13813 are coupled to the RF circuitry 1383, which is coupled to the modem 1322. Zero or more antennas 1384 can be coupled to one or more RF modules 1386, which are also connected to the modem 1322. The zero or more antennas 1384 may be GPS antennas, NFC antennas, other WAN antennas, WLAN or PAN antennas, or the like. The modem 1322 allows the user device 1305 to handle both voice and non-voice communications (such as communications for text messages, multimedia messages, media downloads, web browsing, etc.) with a wireless communication system. The modem 1322 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 1322 may generate signals and send these signals to one of the multiple antennas 1388, and 1384 via RF circuitry 1383, and RF module(s) 1386 as descried herein. User device 1305 may additionally include a WLAN module, a GPS receiver, a PAN transceiver and/or other RF modules. These RF modules may additionally or alternatively be connected to one or more of antennas 1384, 1388. Antennas 1384, 1388 may be configured to transmit in different frequency bands and/or using different wireless communication protocols. The antennas 1384, 1388 may be directional, omnidirectional, or non-directional antennas. In addition to sending data, antennas 1384, 1388 may also receive data, which is sent to appropriate RF modules connected to the antennas.

In one embodiment, the user device 1305 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1322 is shown to control transmission and reception via antenna (1384, 1388), the user device 1305 may alternatively include multiple modems, each of which is configured to transmit/receive data via a different antenna and/or wireless transmission protocol.

The user device 1305 delivers and/or receives items, upgrades, and/or other information via the network. For example, the user device 1305 may download or receive items from an item providing system. The item providing system receives various requests, instructions and other data from the user device 1305 via the network. The item providing system may include one or more machines (e.g., one or more server computer systems, routers, gateways, etc.) that have processing and storage capabilities to provide the above functionality. Communication between the item providing system and the user device 1305 may be enabled via any communication infrastructure. One example of such an infrastructure includes a combination of a wide area network (WAN) and wireless infrastructure, which allows a user to use the user device 1305 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1305.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1305 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1305 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless mesh network comprising:
a first wireless access point (WAP) device designated as a primary device, wherein the first WAP device provides network connectivity to a plurality of client devices over a first dynamic frequency selection (DFS) channel; and
a second WAP device designated as a secondary device to the first WAP device on the first DFS channel; and
wherein, in response to detection of a radar event by the first WAP device:
the first WAP device transitions to being the secondary device on the first DFS channel;
the second WAP device transitions to being the primary device on the first DFS channel;
the second WAP device performs a channel availability check (CAC) on a second DFS channel and communicates availability of the second DFS channel to the first WAP device; and
the first WAP device establishes, based on the availability, the second DFS channel to which to move the plurality of client devices.

2. The wireless mesh network of claim 1, wherein, in response to completion of the CAC by the second WAP device:
the first WAP device transitions to being the primary device on the second DFS channel;
the second WAP device transitions to being the secondary device on the second DFS channel; and
the first WAP device performs in-service monitoring of the second DFS channel.

3. The wireless mesh network of claim 1, further comprising a third WAP device wireless coupled to the first WAP device and the second WAP device, wherein, in response to the detection of the radar event, the first WAP device further:
sends a first radar event packet (REP) to the second WAP device and to the third WAP device, wherein the first REP comprises an identifier of the first DFS channel, an origin medium access control (MAC) address, an identifier of the second DFS channel, a time stamp of the radar event, and a channel move time;
receives a second REP from the second WAP device, the second REP comprising a second MAC address of the second WAP device and information indicating that the second WAP device detected the radar event;
receives a third REP from the third WAP device, the third REP comprising a third MAC address of the third WAP device and information indicating that the third WAP device detected the radar event; and
causes, based on the second REP and the third REP, the second and the third WAP devices to operate on the second DFS channel.

4. The wireless mesh network of claim 3, wherein the first WAP device further:
receives, via the second REP, a first value indicative of physical distance between the first and second WAP devices;
receives, via the third REP, a second value indicative of physical distance between the first and third WAP devices; and
determines, based on the first value and the second value, a location of source of the radar event.

5. The wireless mesh network of claim 3, wherein:
the second REP includes a first strength of radar associated with the radar event and is broadcasted throughout the wireless mesh network; and
the third REP includes a second strength of the radar associated with the radar event and is broadcasted throughout the wireless mesh network.

6. The wireless mesh network of claim 3, wherein each of the second and the third WAP devices communicate with the first WAP device over the second DFS channel.

7. The wireless mesh network of claim 1, further comprising a third WAP device wirelessly coupled to the first WAP device and the second WAP device, wherein each of the second and the third WAP devices stores a channel preference list, and in response to the radar event, each of the second and the third WAP devices:
receives, from the first WAP device, a notice indicative of the radar event; and
in response to the notice, communicates with the first WAP device over the second DFS channel based on presence of the second DFS channel in the channel preference list.

8. A wireless mesh network comprising:
a first wireless access point (WAP) device designated as a primary device on a first dynamic frequency selection (DFS) channel and a secondary device on a second DFS channel and a fourth DFS channel;
a second WAP device designated as a primary device on the second DFS channel and as a secondary device on the first DFS channel, wherein the second WAP device transmits a first available channel list to the first WAP device for propagation to the wireless mesh network, the first available channel list comprising the second DFS channel and a third DFS channel;
a third WAP device designated as a primary device on the fourth DFS channel and as a secondary device on the first DFS channel, wherein the third WAP device transmits a second available channel list to the first WAP device for propagation to the wireless mesh network, the second available channel list comprising at least the fourth DFS channel; and
wherein, in response to detecting a radar event on the first DFS channel, the first WAP device communicates with the second WAP device and the third WAP device using one of the second DFS channel, the third DFS channel, or the fourth DFS channel without performing a channel availability check.

9. The wireless mesh network of claim 8, wherein the first WAP device further:
communicates with the second WAP device using the third DFS channel, wherein a fourth WAP device is a primary device on the third DFS channel; and
communicates with the third WAP devices using the fourth DFS channel.

10. The wireless mesh network of claim 8, wherein the first WAP device further
communicates with the second WAP device using the second DFS channel; and
communicate with the third WAP device using the fourth DFS channel.

11. The wireless mesh network of claim 8, wherein the second available channel list further comprises a fifth DFS channel, and wherein the first WAP device further:
communicates with the second WAP device using the second DFS channel; and
communicates with the third WAP device using the fifth DFS channel, wherein a fourth WAP device is a primary device on the fifth DFS channel.

12. The wireless mesh network of claim 11, wherein the third WAP device:
performs in-service monitoring on the fourth DFS channel; and
performs a channel availability check (CAC) on the fifth DFS channel.

13. The wireless mesh network of claim 8, wherein the second WAP device:
performs in-service monitoring on the second DFS channel; and
performs a channel availability check (CAC) on the third DFS channel.

14. A method comprising:
operating a first wireless access point (WAP) device, wherein the first WAP device is a primary device on a first dynamic frequency selection (DFS) channel and provides network connectivity to a plurality of client devices over the first DFS channel;
operating a second WAP device as a secondary device on the first DFS channel;
detecting, by the first WAP device, a radar event;
transitioning, by the first WAP device, to being the secondary device on the first DFS channel;
transitioning, by the second WAP device, to being the primary device on the first DFS channel;
performing, by the second WAP device, a channel availability check (CAC) on a second DFS channel and communicating availability of the second DFS channel to the first WAP device; and
establishing, by the first WAP device, based on the availability, the second DFS channel to which to move the plurality of client devices.

15. The method of claim 14, further comprising:
transitioning, by the first WAP device, to being primary device on the second DFS channel;
transitioning, by the second WAP device, to being the secondary device on the second DFS channel; and
performing, by the first WAP device, in-service monitoring of the second DFS channel.

16. The method of claim 14, further comprising:
sending, by the first WAP device, a first radar event packet (REP) to the second WAP device and to a third WAP device, wherein the first REP comprises an identifier of the first DFS channel, a first medium access control (MAC) address of the first WAP device, an identifier of the second DFS channel, a time stamp of the radar event, and a channel move time;
receiving, by the first WAP device, a second REP from the second WAP device, the second REP comprising a second MAC address of the second WAP device and information indicating that the second WAP device detected the radar event;
receiving, by the first WAP device, a third REP from the third WAP device, the third REP comprising a third MAC address of the third WAP device and information indicating that the third WAP device detected the radar event; and
causing, based on the second REP and the third REP, the second and the third WAP devices to operate on the second DFS channel.

17. The method of claim 16, further comprising:
receiving, by the first WAP device, a first value indicative of physical distance between the first and the second WAP devices;
receiving, by the first WAP device, a second value indicative of physical distance between the first and the third WAP devices; and
determining, by the first WAP device based on the first value and the second value, a location of source of the radar event.

18. The method of claim 16, wherein the second REP includes a first value indicative of a strength of a radar signal associated with the radar event and the third REP includes a second value indicative of the strength of the radar signal, the method further comprising broadcasting, by the first WAP, the second REP and the third REP.

19. The method of claim 14, further comprising:
operating a third WAP device that is wirelessly coupled to the first WAP device and the second WAP device;
storing, by each of the second WAP device and the third WAP device, a channel preference list including the second DFS channel;
receiving, by the second and the third WAP devices, from the first WAP device, a message indicative of the radar event; and
communicating, by the second and the third WAP devices, with the first WAP device over the second DFS channel.

20. The method of claim 14, further comprising communicating, by the second WAP device to the first WAP device, an idle status comprising data bandwidth usage, by one or more second client devices associated with a wireless network, wherein the data bandwidth usage is below a threshold value.

* * * * *